(12) United States Patent
Kawaura

(10) Patent No.: US 7,327,488 B2
(45) Date of Patent: *Feb. 5, 2008

(54) IMAGE FORMING APPARATUS, PROGRAM UPDATING METHOD AND RECORDING MEDIUM

(75) Inventor: Hisanori Kawaura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1186 days.

This patent is subject to a terminal disclaimer.

(21) Appl. No.: 10/227,308

(22) Filed: Aug. 26, 2002

(65) Prior Publication Data

US 2003/0038968 A1     Feb. 27, 2003

(30) Foreign Application Priority Data

Aug. 27, 2001   (JP)   ............... 2001-257044
Aug. 22, 2002   (JP)   ............... 2002-241389

(51) Int. Cl.
  *G06F 15/00*   (2006.01)
  *G06K 1/00*    (2006.01)
(52) U.S. Cl. .................. 358/1.16; 358/1.15; 399/8
(58) Field of Classification Search ........... 358/1.15, 358/1.16; 399/8
  See application file for complete search history.

(56) References Cited

U.S. PATENT DOCUMENTS

| 4,719,516 A | 1/1988 | Nagashima |
| 5,093,915 A | 3/1992 | Platteter et al. |
| 5,752,040 A | 5/1998 | Kaneko et al. |
| 5,778,070 A | 7/1998 | Mattison |
| 5,875,380 A | 2/1999 | Iwata et al. |
| 5,953,567 A | 9/1999 | Muramatsu et al. |
| 5,987,298 A | 11/1999 | Muramatsu et al. |
| 6,112,046 A | 8/2000 | Suzuki et al. |
| 6,122,468 A | 9/2000 | Sakamoto et al. |

(Continued)

FOREIGN PATENT DOCUMENTS

JP    5-274157    10/1993

(Continued)

OTHER PUBLICATIONS

U.S. Appl. No. 09/809,075, filed Mar. 16, 2001, pending.

(Continued)

*Primary Examiner*—Douglas Q. Tran
*Assistant Examiner*—Satwant Singh
(74) *Attorney, Agent, or Firm*—Oblon, Spivak, McClelland, Maier & Neustadt, P.C.

(57) ABSTRACT

An image forming apparatus includes hardware resources used by an image forming process, a storage section which stores one or more programs for carrying out processes of user services and control services related to the image forming process, a start information acquiring section which acquires starting information of each of the programs stored in the storage section, a module identification information acquiring section which acquires module identification information of at least one arbitrary program from a recording medium which is recorded with updating data for a plurality of programs, an updating data selection section which selects the updating data corresponding to the at least one arbitrary program from the recording medium, based on the starting information and the module identification information, and an updating section which updates the at least one arbitrary program stored in the storage section based on the selected updating data.

23 Claims, 19 Drawing Sheets

U.S. PATENT DOCUMENTS

| | | | |
|---|---|---|---|
| 6,128,459 | A | 10/2000 | Iwata et al. |
| 6,142,690 | A | 11/2000 | Yoshimura et al. |
| 6,163,669 | A | 12/2000 | Aoki et al. |
| 6,201,941 | B1 | 3/2001 | Kasahara et al. |
| 6,249,304 | B1 | 6/2001 | Sawayama et al. |
| 6,282,396 | B1 | 8/2001 | Iwata et al. |
| 6,295,437 | B1 | 9/2001 | Hodoshima et al. |
| 6,381,435 | B2 | 4/2002 | Shinohara et al. |
| 6,393,241 | B1 | 5/2002 | Matsumoto et al. |
| 6,505,022 | B2 | 1/2003 | Kosuge et al. |
| 6,507,720 | B2 | 1/2003 | Kabumoto et al. |
| 6,915,085 | B2* | 7/2005 | Kawaura ................ 399/8 |
| 6,952,535 | B2* | 10/2005 | Kawaura ................ 399/8 |
| 2002/0046265 | A1 | 4/2002 | Suzuki |
| 2003/0038968 | A1 | 2/2003 | Kawaura |
| 2005/0100353 | A1* | 5/2005 | Kawaura ................ 399/8 |

FOREIGN PATENT DOCUMENTS

| | | |
|---|---|---|
| JP | 9-97221 | 4/1997 |
| JP | 9-134307 | 5/1997 |
| JP | 9-200403 | 7/1997 |
| JP | 10-107979 | 4/1998 |
| JP | 2002-82806 | 3/2002 |
| JP | 2002-99441 | 4/2002 |

OTHER PUBLICATIONS

U.S. Appl. No. 09/963,644, filed Sep. 27, 2001, pending.
U.S. Appl. No. 09/978,097, filed Oct. 17, 2001, pending.
U.S. Appl. No. 10/102,633, filed Mar. 22, 2002, pending.
U.S. Appl. No. 10/073,237, filed Feb. 13, 2002, allowed.
U.S. Appl. No. 10/152,672, filed May 23, 2002, pending.
U.S. Appl. No. 10/227,308, filed Aug. 26, 2002, pending.
U.S. Appl. No. 10/227,303, filed Aug. 26, 2002, pending.
U.S. Appl. No. 10/281,250, filed Oct. 28, 2002, pending.
U.S. Appl. No. 09/465,674, filed Dec. 17, 1999, unknown.
U.S. Appl. No. 09/907,326, filed Jul. 17, 2001, unknown.
U.S. Appl. No. 09/556,968, filed Apr. 24, 2000, pending.
U.S. Appl. No. 09/785,234, filed Feb. 20, 2001, allowed.
U.S. Appl. No. 09/801,806, filed Mar. 9, 2001, pending.
U.S. Appl. No. 09/917,930, filed Jul. 31, 2001, allowed.
U.S. Appl. No. 09/943,505, filed Aug. 31, 2001, pending.
U.S. Appl. No. 09/987,027, filed Nov. 13, 2001, allowed.
U.S. Appl. No. 09/985,368, filed Nov. 2, 2001, allowed.
U.S. Appl. No. 10/059,187, filed Jan. 31, 2002, pending.
U.S. Appl. No. 10/133,484, filed Apr. 29, 2002, pending.
U.S. Appl. No. 10/231,281, filed Aug. 30, 2002, pending.
U.S. Appl. No. 10/227,308, filed Aug. 26, 2002, pending.
U.S. Appl. No. 10/316,156, filed Dec. 11, 2002, pending.
U.S. Appl. No. 10/227,308, filed Aug. 26, 2002, Kawaura.
U.S. Appl. No. 10/369,907, filed Feb. 21, 2003, Ikuno et al.
U.S. Appl. No. 10/379,532, filed Mar. 6, 2003, Morii et al.
U.S. Appl. No. 10/429,865, filed May 6, 2003, Kobayashi et al.
U.S. Appl. No. 10/617,399, filed Jul. 11, 2003, Satoh.
U.S. Appl. No. 10/801,684, filed Mar. 17, 2004, Kawaura et al.
U.S. Appl. No. 10/801,822, filed Mar. 17, 2004, Kimbara et al.
U.S. Appl. No. 10/859,358, filed Jun. 3, 2004, Mizukami.
U.S. Appl. No. 10/942,899, filed Sep. 17, 2004, Satoh et al.
U.S. Appl. No. 10/986,781, filed Nov. 15, 2004, Matsuura et al.
U.S. Appl. No. 11/007,708, filed Dec. 9, 2004, Kawaura et al.
Murakawa et al., "DocuStation IM200", Fuji Xerox Technical Report, Fuji Xerox Co., Ltd., Mar. 21, 1997, No. 11 1996, pp. 126-129 (with partial English translation).

* cited by examiner

FIG.18

MODULEID: SYSTEM
VERSION: 1.00
mount / mnt 0x650000

IMAGE FORMING APPARATUS, PROGRAM UPDATING METHOD AND RECORDING MEDIUM

BACKGROUND OF THE INVENTION

This application claims the benefit of Japanese Patent Applications No. 2001-257044 filed Aug. 27, 2001, and No. 2002-241389 filed Aug. 22, 2002, in the Japanese Patent Office, the disclosures of which are hereby incorporated by reference.

1. Field of the Invention

The present invention generally relates to image forming apparatuses, program updating methods and recording media, and more particularly to an image forming apparatus which rewrites a program stored in a storage section by updating data, a program updating method for updating the program by the updating data, and a computer-readable recording medium which stores a computer program for causing a computer to update the program by such a program updating method.

2. Description of the Related Art

Recently, an image forming apparatus (hereinafter referred to a composite apparatus) has been developed which includes the functions of a plurality of apparatuses such as a printing apparatus, a copying machine, a scanner and a facsimile machine. The composite apparatus has a display section, a printing section, an image pickup section and the like provided within a single housing. In addition, the composite apparatus is provided with three kinds of software respectively corresponding to the printing apparatus, copying machine and the facsimile machine, and the composite apparatus is operated as the printing apparatus, the copying machine, the scanner or the facsimile machine by switching the kind of software.

In the conventional composite apparatus, the software, including the general purpose operating system (OS), is provided independently within the composite apparatus for the functions of each of the printing apparatus, the copying machine, the scanner and the facsimile machine. For this reason, it takes considerable time to develop the software for each of the printing apparatus, the copying machine, the scanner and the facsimile machine.

Accordingly, an image forming apparatus having a platform was proposed in a Japanese Laid-Open Patent Application No. 2002-82806. The proposed image forming apparatus uses hardware resources such as the display section, the printing section and the image pickup section, and is provided with a plurality of application programs (hereinafter simply referred to as applications) for carrying out processes peculiar to each user service of the printing apparatus, the copying machine and the facsimile machine. The platform is interposed between the applications and the hardware resources. The platform includes various control services for managing the hardware resources which are commonly required by at least two applications, controlling execution and carrying out an image forming process, when providing the user service. The user service refers to a service which is related to the image forming apparatus and is provided with respect to the user. On the other hand, the control service refers to a service which provides a hardware resource related to the image forming process with respect to the application.

According to the proposed image forming apparatus, the platform manages the hardware resources which are commonly required by at least two applications, controls the execution and carries out the image forming process. Hence, it is possible to efficiently develop the software, and to improve the productivity of the apparatus as a whole.

In the composite apparatus such as the proposed image forming apparatus, programs such as the plurality of applications and the plurality of control services forming the platform are installed in a read only memory (ROM) such as a flash memory on a controller board of the composite apparatus when the composite apparatus is forwarded. For this reason, when a design modification is made or a new function is added to the composite apparatus, the programs such as the applications and the control services must be updated (or rewritten) by updating the programs stored in the ROM.

For example, program updating methods are proposed in Japanese Laid-Open Patent Applications No. 9-134307 and No. 2002-99441. In addition, another program updating method stores updating data for each program, and updating programs for updating the existing programs such as the applications and the control services using the updating data, in an updating recording medium such as a flash card which is provided independently for each model of the composite apparatus.

The updating recording medium is selected depending on the model of the composite apparatus which is installed with the target program which is to be updated, and the power of the composite apparatus is turned ON in a state where the selected updating recording medium is inserted into a recording medium control unit of the composite apparatus.

The updating program stored in the updating recording medium is started by a boot loader of the composite apparatus. The updating data stored in the updating recording medium is read by the updating program, and the updating data is used to update (or rewrite) the programs such as the applications and the control services stored in the ROM.

The process of starting the updating program stored in the updating recording medium by the boot loader when the power of the composite apparatus is turned ON is carried out in the following manner. FIG. 1 is a diagram schematically showing memory maps of the flash memory and the flash card when turning ON the power of the composite apparatus.

As shown in FIG. 1, the region of the flash memory on the controller board and the region of the updating recording medium are switched by switching ON and OFF states of a DIP switch which is provided on the controller board.

Measures are taken so that a boot vector indicates a normal start program of the flash memory when the DIP switch is OFF, and the updating program of the updating recording medium is arranged at the boot vector when the DIP switch is ON. Accordingly, the updating program arranged at the boot vector is started when updating the program by turning ON the DIP switch and turning ON the power of the composite apparatus.

The composite apparatus provides composite services including services of the copying machine, the printing machine, the scanner and the facsimile machine. However, the services that can be provided by the composite apparatus is not unified for all of the models of the composite apparatus. For example, some models of the composite apparatus may have all of the functions of the copying machine, the printing machine, the scanner and the facsimile machine, while other models may only have some of the functions such as the facsimile and copy functions. For this reason, the plurality of control services and the plurality of applications operating on the general purpose operating system (OS) naturally differ depending on the functions that may be provided by the composite apparatus.

But according to the program updating methods proposed in the Japanese Laid-Open Patent Applications No. 9-134307 and No. 2002-99441, there is a problem in that the programs cannot be updated depending on the configuration of the composite apparatus.

In addition, according to the proposed program updating methods for the composite apparatus described above, when the updating recording medium is inserted into the composite apparatus and the power of the composite apparatus is turned ON, the updating program is executed immediately without starting the applications, the control services and the general purpose operating system (OS). Consequently, it is impossible to recognize the configuration of the composite apparatus, and there is a problem in that the programs cannot be updated depending on the configuration of the composite apparatus.

For example, assume that a certain composite apparatus has a configuration such that no programs related to the facsimile communication, such as the facsimile application and the facsimile control service, are provided. If the program updating process is carried out with respect to this certain composite apparatus using the updating recording medium which stores the updating data for all programs, there is a possibility that a program within the ROM which does not need to be updated is updated by the program updating process. In this case, the updating of the program which does not need to be updated may generate a failure in the composite apparatus.

Moreover, according to the proposed program updating methods for the composite apparatus, the updating recording medium stores the updating programs in addition to the updating data. Hence, the updating recording medium such as the flash card must be prepared for each model of the composite apparatus which requires updating of the programs, due to limited storage capacity of the updating recording medium.

For this reason, the updating recording media must be managed for each of the models of the composite apparatus, and care must be taken so that the updating recording medium intended for a different model of the composite apparatus will not be selected when updating the programs of the composite apparatus. As a result, there is a problem in that the operation of updating the programs of the composite apparatus is troublesome to perform.

Furthermore, according to the proposed program updating methods for the composite apparatus, the power of the composite apparatus must be turned ON after switching the DIP switch to the ON state. Thus, in a case where the DIP switch is provided within the main body of the composite apparatus, it is necessary for a person such as the user to remove a cover of the main body and to pull out the controller board. When performing such an operation, the person may touch the controller board and cause damage to the controller board.

SUMMARY OF THE INVENTION

Accordingly, it is a general object of the present invention to provide a novel and useful image forming apparatus, program updating method and computer-readable recording medium, in which the problems described above are eliminated.

Another and more specific object of the present invention is to provide an image forming apparatus, program updating method and computer-readable recording medium which can update programs by selecting optimum updating data depending on a configuration of the image forming apparatus.

Still another specific object of the present invention is to provide an image forming apparatus, program updating method and computer-readable recording medium which can update programs of a plurality of models of the image forming apparatus using one kind of recording medium.

A further specific object of the present invention is to provide an image forming apparatus, program updating method and computer-readable recording medium which can prevent hardware failure when carrying out a program updating operation.

Another object of the present invention is to provide an image forming apparatus comprising hardware resources used by an image forming process; a storage section which stores one or more programs for carrying out processes of user services and control services related to the image forming process; a start information acquiring section which acquires starting information of each of the programs stored in the storage section; a module identification information acquiring section which acquires module identification information of at least one arbitrary program from a recording medium which is recorded with updating data for a plurality of programs; an updating data selection section which selects the updating data corresponding to the at least one arbitrary program from the recording medium, based on the starting information and the module identification information; and an updating section which updates the at least one arbitrary program stored in the storage section based on the selected updating data. According to the image forming apparatus of the present invention, it is possible to carry out a program updating process by selecting the appropriate updating data depending on the configuration of the image forming apparatus.

The program starting information is used to identify the program, and a program name, a program ID or the like may be used for the program starting information. In addition, the module identification information is used to identify the program which is the target of the updating based on the updating data, and a program name, a program ID or the like may be used for the module identification information.

In the image forming apparatus, the starting information acquiring section may acquire the starting information of each of the programs stored in the storage section upon detection of the recording medium. In this case, the process of the starting information acquiring section can be triggered using the detection or recognition of the recording medium.

In the image forming apparatus, the control services may include a system control service carrying out processes of a normal mode thread which carries out a normal process and a program updating mode thread which carries out a process of selecting the updating data from a group of updating data recorded in the recording medium, the system control service may operate as the updating data selection section, and the starting information acquiring section may start the program updating mode thread of the system control service when carrying out a program updating process. In this case, the updating data selection section operates as the process including the program updating mode thread which carries out the updating data selection process, so that the updating data selection process can be executed by a thread which is independent of the normal mode thread which carries out the normal process. For this reason, the normal process and the program updating process can be separated by the processes of the single updating data selection section, and there is no need to separately provide a process for carrying out the updating data selection process. Consequently, it is possible to avoid a processing delay which would otherwise occur if the processes were to be switched for the program updating process.

In the image forming apparatus, each of the control services may carry out processes of a normal mode thread which carries out a normal operation and a program updating mode thread which stops processes related to the image forming process, and the starting information acquiring section may start each program updating mode thread of the control services when carrying out the program updating process. In this case, each control service operates as the process including the normal mode thread and the program updating mode thread. Hence, by starting each program updating mode thread of the control services by the starting information acquiring section at the time of the program updating process, the program updating process can be carried out in a state where the processes related to the image forming process are stopped, even in a case where the control service is started in order to recognize the configuration of the image forming apparatus. For this reason, it is possible to prevent the program updating process from being discontinued due to the operation of an unwanted function during the program updating process.

In the image forming apparatus, the module identification information acquiring section may judge whether or not the updating data is recorded in the recording medium based on medium identification information which is peculiar to the recording medium, and start each program updating mode thread of the control services if the updating data is recorded in the recording medium. In this case, the program updating process by the system control service which is started in the program updating mode is started by inserting or connecting the recording medium to the image forming apparatus. For this reason, it is possible to realize the program updating process without requiring a DIP switch to be switched as was required in the proposed program updating methods.

In the image forming apparatus, the program updating mode thread of the system control service may search for a file stored in the storage section to acquire the starting information of the arbitrary program, and selects the updating data of the arbitrary program based on the starting information of the arbitrary program. In this case, it is possible to know the programs which can operate in the image forming apparatus without having to actually execute the programs, and the program updating process can be carried out by selecting the appropriate updating data depending on the configuration of the image forming apparatus.

In the image forming apparatus, the program updating mode thread of the system control service may compare all module identification recorded in the recording medium and the starting information of the arbitrary program, and select the updating data corresponding to the module identification information matching the starting information. In this case, it is possible to accurately select the updating data depending on the configuration of the image forming apparatus, from all of the module identification information recorded in the recording medium, so that an appropriate program updating process can be carried out depending on the configuration of the image forming apparatus.

The image forming apparatus may further comprise a model identification information acquiring section which acquires a model identification information peculiar to a model of the image forming apparatus, the recording medium may be recorded with the module identification information of each of the programs and the updating data of each of the programs in correspondence with each other, and be further recorded with model identification information of image forming apparatuses in which the programs can operate for each module identification information, and the program updating mode thread of the system control service may compare all module identification information recorded in the recording medium and the starting information of the arbitrary program, so that the updating data is selected based on the module identification information matching the starting information and the model identification information acquired by the model identification information acquiring section. In this case, even if the arrangement of the programs which can operate in the image forming apparatus differ depending on the model of the image forming apparatus, it is possible to use in common one kind of recording medium for the program updating process of a plurality of models of the image forming apparatus.

In the image forming apparatus, the recording medium may be recorded with an updating destination region of the storage section where the updating data is written for each module identification information, and the updating section may update the arbitrary program from the updating destination region of the storage section based on the selected updating data. In this case, it becomes unnecessary to carry out a process of determining the arrangement or updating destination of the program stored in the storage section, by rewriting the updating destination region of the storage section by the updating data. As a result, the program updating process can be carried out accurately and quickly.

In the image forming apparatus, the recording medium may be recorded with the updating destination region for each model identification information. In this case, even if the arrangement of-the programs which can operate in the image forming apparatus differ depending on the model of the image forming apparatus, it is possible to accurately and quickly carry out the program updating process with respect to a plurality of models of the image forming apparatus using one kind of recording medium.

In the image forming apparatus, the updating section may check the arbitrary program after being updated by comparing the updated arbitrary program and the updating data to check a match therebetween. In this case, it is possible to quickly detect an error generated during the program updating process.

The image forming apparatus may further comprises a non-volatile memory which stores updating information related to a program updating process, the updating section may store the updating information in the non-volatile memory when carrying out the program updating process and judges whether or not the updating information is stored in the non-volatile memory prior to the program updating process, so as to update the arbitrary program based on the updating information stored in the non-volatile memory if the updating information is stored in the non-volatile memory. In this case, it is possible to restore the updating data when the program updating process is next started, even if the program updating process is discontinued halfway. In addition, the program updating process when next started can be resumed from the point where the program updating process was previously discontinued, so that the program updating process can quickly be resumed after being discontinued.

Still another object of the present invention is to provide a program updating method for updating at least one arbitrary one of a plurality of programs stored in a storage section of an apparatus, comprising a start information acquiring step which acquires starting information of each of the programs stored in the storage section; a module identification information acquiring step which acquires module identification information of at least one arbitrary program from a recording medium which is recorded with updating data for the plurality of programs; an updating data selection step which selects the updating data corresponding to the at least one arbitrary program from the recording medium, based on the starting information and the module identification information; and an updating step which updates the at least one arbitrary program stored in the storage section based on the selected updating data. According to the program updating method of the present invention, it is possible to carry out the program updating process by selecting the appropriate updating data depending on the configuration of the program which operates in the apparatus, by selecting the updating data from the recording medium based on the acquired starting information and module identification information, and updating the program which is stored in the storage section based on the selected updating data.

A further object of the present invention is to provide a computer-readable storage medium which stores a program for causing a computer to update a program which is stored in a storage section, where the program comprises a start information acquiring procedure which causes the computer to acquire starting information of each of the programs stored in the storage section; a module identification information acquiring procedure which causes the computer to acquire module identification information of at least one arbitrary program from a recording medium which is recorded with updating data for the plurality of programs; an updating data selection procedure which causes the computer to select the updating data corresponding to the at least one arbitrary program from the recording medium, based on the starting information and the module identification information; and an updating procedure which causes the computer to update the at least one arbitrary program stored in the storage section based on the selected updating data. According to the computer-readable storage medium of the present invention, it is possible to carry out the program updating process by selecting the appropriate updating data depending on the configuration of the program which operates in the apparatus, by selecting the updating data from the recording medium based on the acquired starting information and module identification information, and updating the program which is stored in the storage section based on the selected updating data.

Therefore, according to the present invention, it is possible to carry out the program updating process by selecting the optimum updating data depending on the configuration of the image forming apparatus, and cope with the program updating process of a plurality of models of the image forming apparatus using one kind of recording medium which can be shared by the plurality of models. In addition, it is possible to prevent the hardware failure from being generated due to the operation of updating the program.

Other objects and further objects of the present invention will be apparent from the following detailed description when read in conjunction with the accompanying drawings.

BRIEF DESCRIPTION OF THE DRAWINGS

FIG. 18 is a diagram showing a structure of a starting information file; and

DESCRIPTION OF THE PREFERRED EMBODIMENTS

A description will be given of various embodiments of an image forming apparatus, a program updating method and a computer-readable recording medium according to the present invention, by referring to FIG. 2 and the subsequent drawings.

First Embodiment

Figure 1:
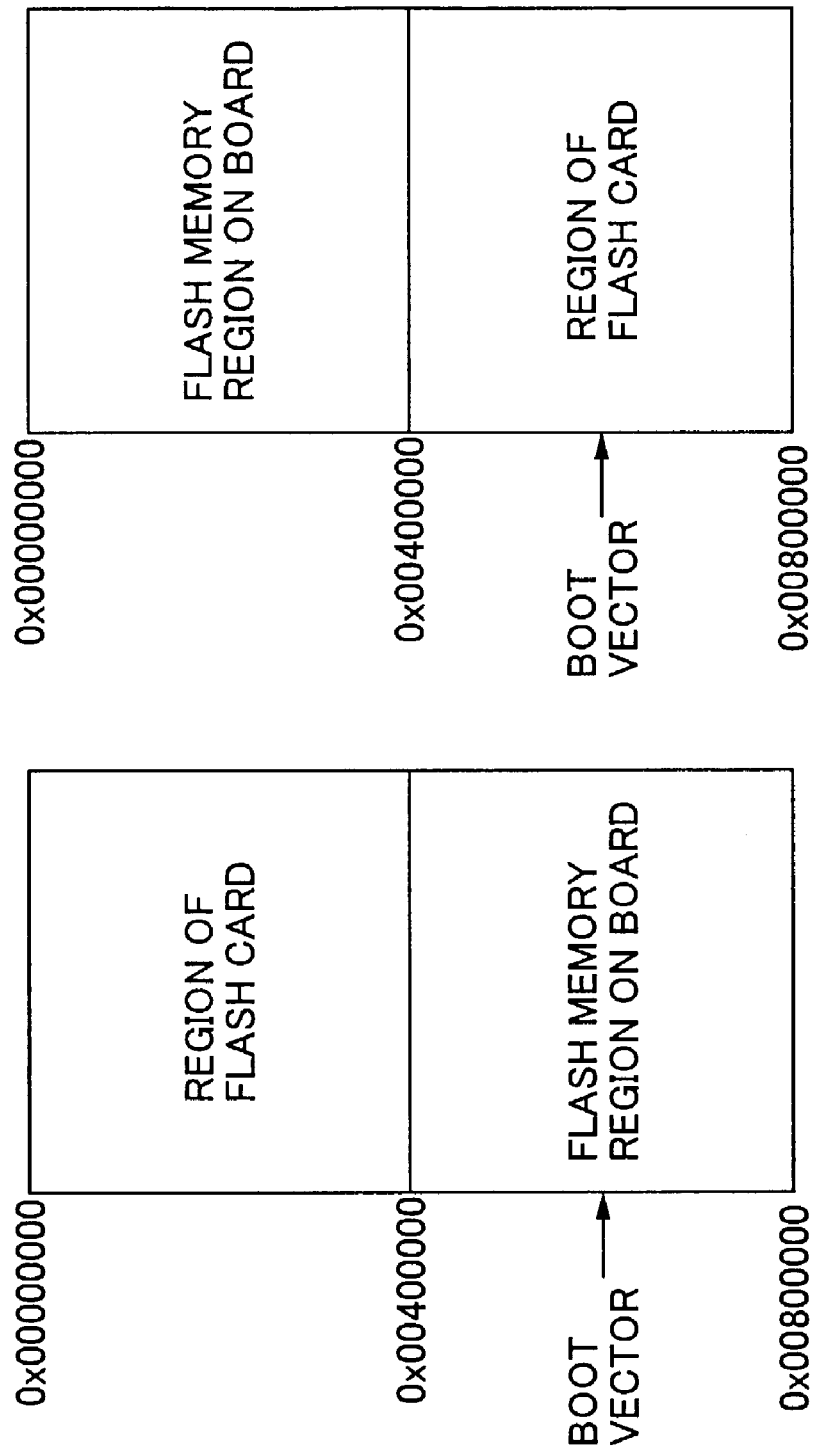
FIG. 1 is a diagram schematically showing memory maps of a flash memory and a flash card when turning ON the power of a composite apparatus.
Figure 2:
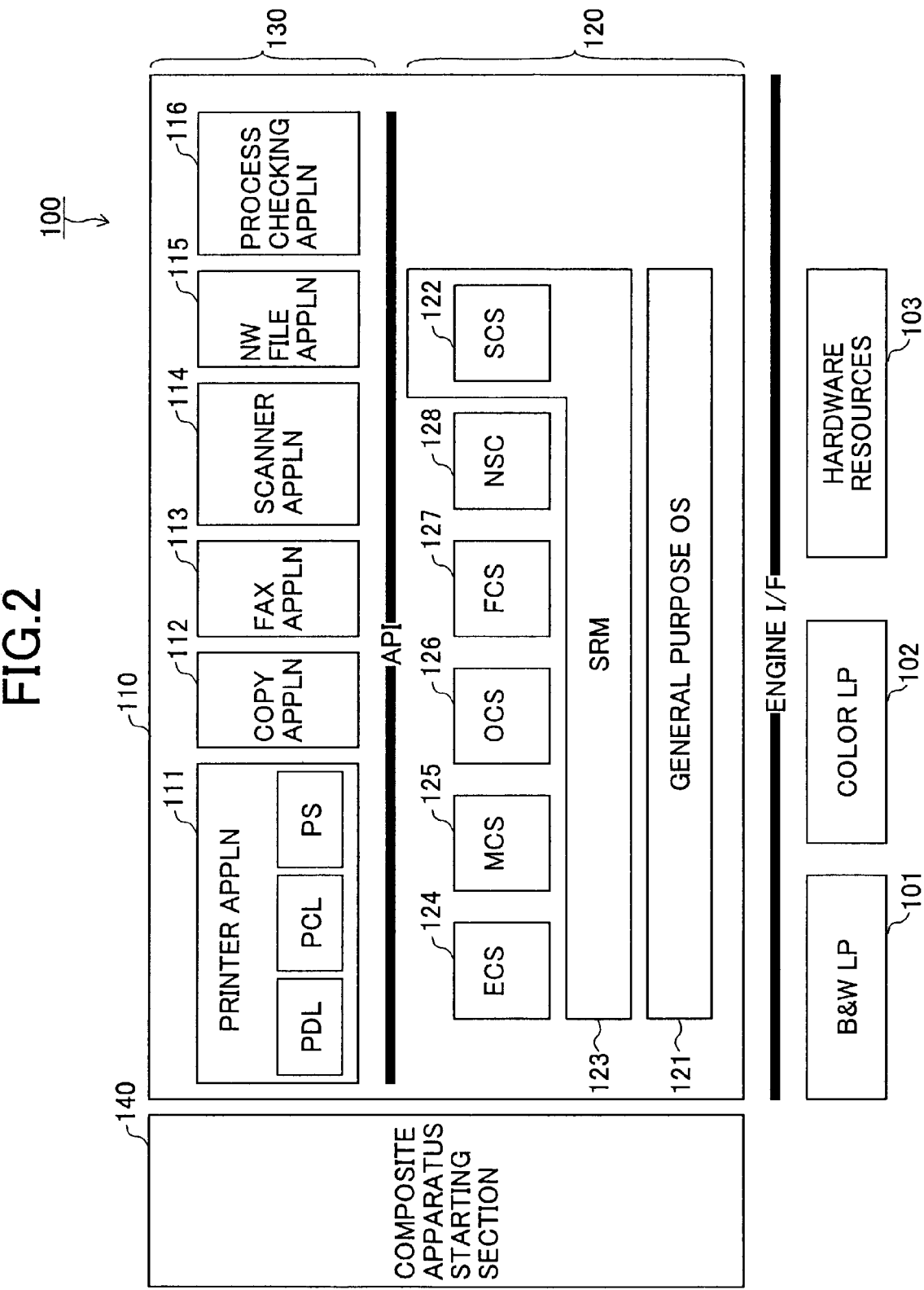
FIG. 2 is a system block diagram showing a functional structure of a first embodiment of an image forming apparatus according to the present invention.

FIG. 2 is a system block diagram showing a functional structure of a first embodiment of the image forming apparatus according to the present invention. A composite apparatus 100 shown in FIG. 2 includes a black and white line printer (B&W LP) 101, a color line printer (Color LP) 102, hardware resources 103 such as a scanner and a facsimile machine, a software group 110, and a composite apparatus starting section 140. The software group 110 is formed by a platform 120 and applications 130. The composite apparatus starting section 140 is executed when turning ON the power of the composite apparatus 100.

The composite apparatus starting section 140 is first executed when turning ON the power of the composite apparatus 100, so as to execute each of the modules described above depending on a starting mode. The starting mode includes a normal mode and a ROM updating mode. The normal mode starts the composite apparatus 100 to carry out normal composite services such as copying, printing, scanning and facsimile functions. The ROM updating mode starts the composite apparatus 100 to update a storage section such as a flash memory. The composite apparatus 100 is started in the ROM updating mode when the power of the composite apparatus 100 is turned ON in a state where a ROM updating flash card 207 is inserted into the composite apparatus 100.

The platform 120 manages control services which generate hardware resource acquisition requests by interpreting processing requests from the applications 130, and one or a plurality of hardware resources 103. The platform 120 includes a system resource manager (SRM) 123 which carries out arbitration of the acquisition requests from the control services, and a general purpose operating system (OS) 121.

The control services are formed by a plurality of service modules, including a system control service (SCS) 122, an engine control service (ECS) 124, a memory control service (MCS) 125, an operation panel control service (OCS) 126, a facsimile control service (FCS) 127, and a network control service (NCS) 128. The platform 120 includes an application program interface (API) which enables reception of the processing requests from the applications 130 using a predefined function.

The general purpose OS 121 is formed by a UNIX (registered trademark) operating system or the like which executes in parallel each software of the platform 120 and the applications 130 as processes.

The process of the SRM 123 manages the resources and controls the system together with the SCS 122. The process of the SRM 123 carries out an arbitration depending on requests from an upper layer which uses the hardware resources such as engines of the scanner section and the printer section, memory, hard disk drive (HDD) file, host input/output (I/O) interface (centronics interface (I/F)), network interface (I/F), IEEE1394 interface (I/F), RS232C interface (I/F) and the like. The process of the SRM 123 includes a normal mode thread which is executed when carrying out a composite service for controlling execution, and a ROM updating mode thread which does not manage the resources and is simply started.

More particularly, the normal mode thread of the SRM 123 judges whether or not the requested hardware resource is usable (or not used by another request), and if the requested hardware resource is usable, notifies the upper layer that the requested hardware resource is usable. In addition, the SRM 123 carries out a scheduling of the use of the hardware resources with respect to the requests from the upper layer, and directly executes the requested contents such as paper transport and image formation by the printer engine, securing memory and file generation.

The process of the SCS 122 includes a normal mode thread which is executed when carrying out a composite service such as application management, operation section control, system screen display, light emitting diode (LED) display, resource management and interrupt application control.

The process of the SCS 122 includes, separately from the normal mode thread, a ROM updating mode thread which is started only when the composite apparatus 100 is started in the ROM updating mode. When the composite apparatus 100 is started in the ROM updating mode, the ROM updating mode thread of the SCS 122 carries out a process of selecting the updating data depending on the configuration of the applications and the control services which operate in the composite apparatus 100, from the updating data stored in the ROM updating flash card 207.

The process of the ECS 124 includes a normal mode thread, and a ROM updating mode thread which does not carry out an engine control and is simply started. The normal mode thread of the ECS 124 is executed when carrying out as the composite service the engine control of the hardware resources 102 which include the black and white line printer 101, the color line printer 102, the scanner, the facsimile machine and the like.

The process of the MCS 125 includes a normal mode thread, and a ROM updating mode thread. The normal mode thread of the MCS 125 is executed when carrying out the composite services of the copying machine, printing apparatus (printer), facsimile machine and scanner, such as releasing acquisition of an image memory, utilization of the HDD and compression and expansion of image data. The ROM updating mode thread of the MCS 125 does not execute such functions of the copying machine, printing apparatus (printer), facsimile machine and scanner, and is simply started.

The process of the OCS 126 includes a normal mode thread and a ROM updating mode thread. The normal mode thread of the OCS 126 is started when carrying out the composite services such as controlling an operation panel which forms an information transfer means (or section) between the operator (user) and the main body control of the composite apparatus 100. The ROM updating mode thread does not carry out the operation panel control, and is simply started.

The process of the FCS 127 includes a normal mode thread and a ROM updating mode thread. The normal mode thread of the FCS 127 is started when carrying out the composite service to provide the API for facsimile transmission and reception using a PSTN and/or an ISDN from each application layer of the system controller, registration or referral to various facsimile data managed in a backup SRAM (BKM), facsimile reception printing, and united transmission and reception. The ROM updating mode thread of the FCS 127 does not execute such functions for providing the API, and is simply started.

The process of the NCS 128 provides services which may be used in common with respect to the applications which require the network I/O interface. The process of the NCS 128 includes a normal mode thread and a ROM updating mode thread. The normal mode thread of the NCS 128 is executed when carrying out the composite service to intermediate, such as distributing to the applications the data received from the network according to the protocols and transmitting the data from the applications to the network. The ROM updating mode thread of the NCS 128 does not execute such functions for providing intermediation, and is simply started.

As described above, the ROM updating mode thread of each of the ECS 124, the MCS 125, the OCS 126, the FCS 127, the NCS 128 and the SRM 123 is simply started, so as to indicate the existence of a control service which operates within the composite apparatus 100 when carrying out the ROM updating process. The ROM updating mode thread of the SCS 122 carries out the process of selecting the updating data when carrying out the ROM updating process, and indicates the existence of the control service which operates within the composite apparatus 100.

The applications 130 include a process checking application 116, a network file application 115, a scanner application 114, a facsimile application 113, a copy application 112, and a printer application 111 in page description language (PDL), PCL and postscript (PS). The printer application 111 is used by the printer. The copy application 112 is used by the copying machine. The facsimile application 113 is used by the facsimile machine. The scanner application 114 is used by the scanner. The network file application 115 is used by a network file. The process checking application 116 is used for process checking.

Figure 3:
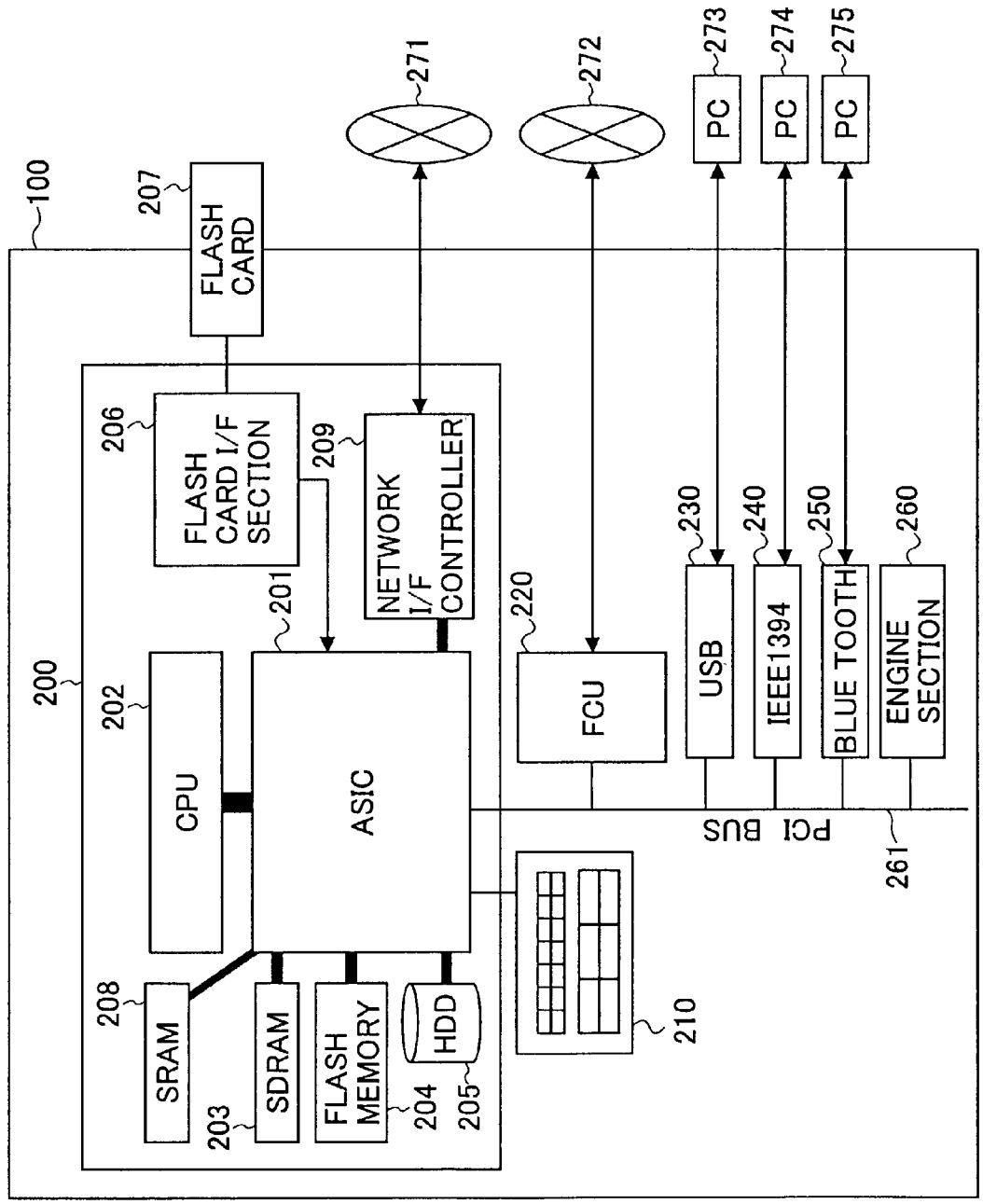
FIG. 3 is a system block diagram showing a hardware structure of the first embodiment of the image forming apparatus.

FIG. 3 is a system block diagram showing a hardware structure of the first embodiment of the image forming apparatus. As shown in FIG. 3, the composite apparatus 100 includes a controller board 200, an operation panel 210, a facsimile control unit (FCU) 220, a USB device 230, an IEEE1394 device 240, a blue tooth device 250, and an engine section 260.

The controller board 200 shown in FIG. 3 includes an ASIC 201, a CPU 202, an SDRAM 203, a flash memory 204, a HDD 205, a flash card interface section 206, an SRAM 208, and a network interface controller 209.

The operation panel 210 is directly connected to the ASIC 201. The PCU 220, the USC device 230, the IEEE1394 device 240, the blue tooth device 250 and the engine section 260 are connected to the ASIC 201 via a PCI bus 261.

The network interface controller 209 communicates with other deices connected to a network 271 using a MAC address or the like. The FCU 220 is connected to a telephone network 272. In addition, the USB device 230, the IEEE1394 device 240 and the blue tooth device 250 are connected to other terminals 273 through 275.

The flash card interface section 206 provides an interface between the composite apparatus 100 and the ROM updating flash card 207 which is inserted into the composite apparatus 100. The ROM updating flash card 207 forms an embodiment of the computer-readable storage medium according to the present invention. The ROM updating flash card 207 stores updating data for each application, each control service and each program of the system resource manager, and also stores updating destination address, for example, as an updating destination region.

The flash memory 204 forms the storage section of this embodiment. The storage section is of course not limited to the flash memory 204, and may be formed by the SDRAM 203, the HDD 205 or the like.

The SRAM 208 forms a non-volatile storage means (or section) of this embodiment. The non-volatile storage means may be formed by any non-volatile memory which is backed up by a battery, so as to store various information which is being updated for process recovery, when the power is disconnected during the ROM updating process.

The flash memory (hereinafter referred to as a flash ROM) 204 stores each application, each control service forming the platform 120, and each program of the SRM 123.

Figure 4:
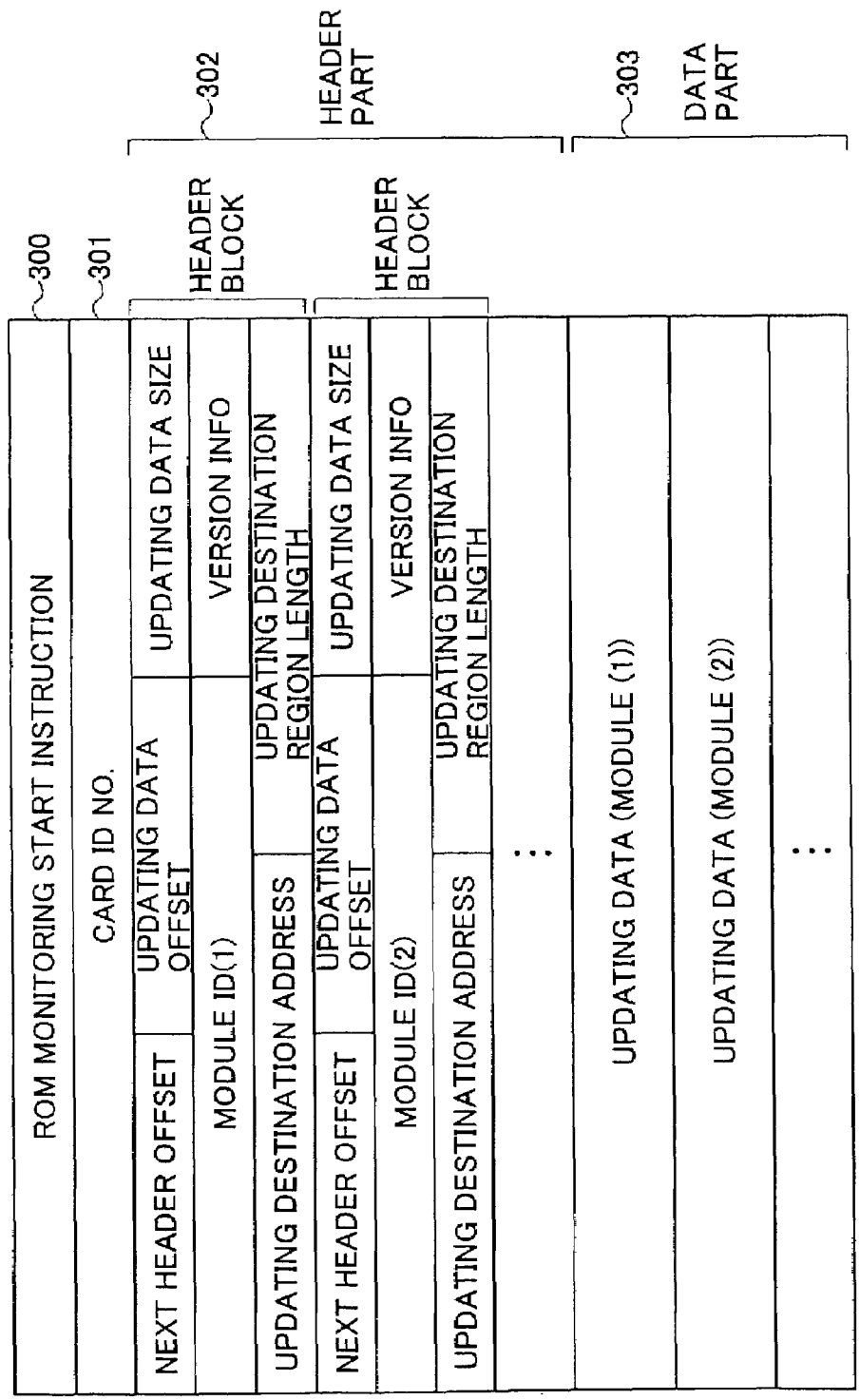
FIG. 4 is a diagram showing a data structure employed by a flash card.

FIG. 4 is a diagram showing a data structure employed by the flash card 207. As shown in FIG. 4, a memory region of the flash card 207 includes a ROM monitoring start instruction 300 at the beginning, a card identification number 301, a header part 302, and a data part 303.

The ROM monitoring start instruction 300 is referred to when starting the composite apparatus 100 and starts the ROM monitoring process which will be described later. The card identification number 301 identifies the kind of flash card 207. A different card identification number is allocated in advance to each of the flash cards such as the ROM updating flash card, language flash card and editing flash card. In this first embodiment, an identification number peculiar to the ROM updating flash card is recorded in the card identification number 301 of the flash card 207.

The header part 302 is divided into header blocks for each of the modules, so as to corresponding to the modules to be updated. Each header block includes a next header offset which indicates an offset to the next header block, an updating data offset which indicates an offset to the updating data of the module, a size of the updating data, a module identification (ID) which indicates identification information of the module, version information which indicates a version of the module, an updating destination address which indicates a relative address of the module in the flash ROM 204, and an updating destination region length which indicates the size of the module.

The module can be updated in units of programs which may be in units of control services such as the MCS 125, the ECS 124 and the NCS 125, in units of applications such as the printer application 111 and the copy application 112, and in units of engines such as the printer engines 101 and 102 and the scanner engine. In addition, the updating data is obtained by compressing binary data of an updating program with respect to each of such modules.

The data part 303 is recorded next to the header part 302, and the updating data is stored in the data part 303 for each module. The beginning of the updating data of each module can be referred to by the updating data offset of the header block corresponding to the module.

Figure 5:
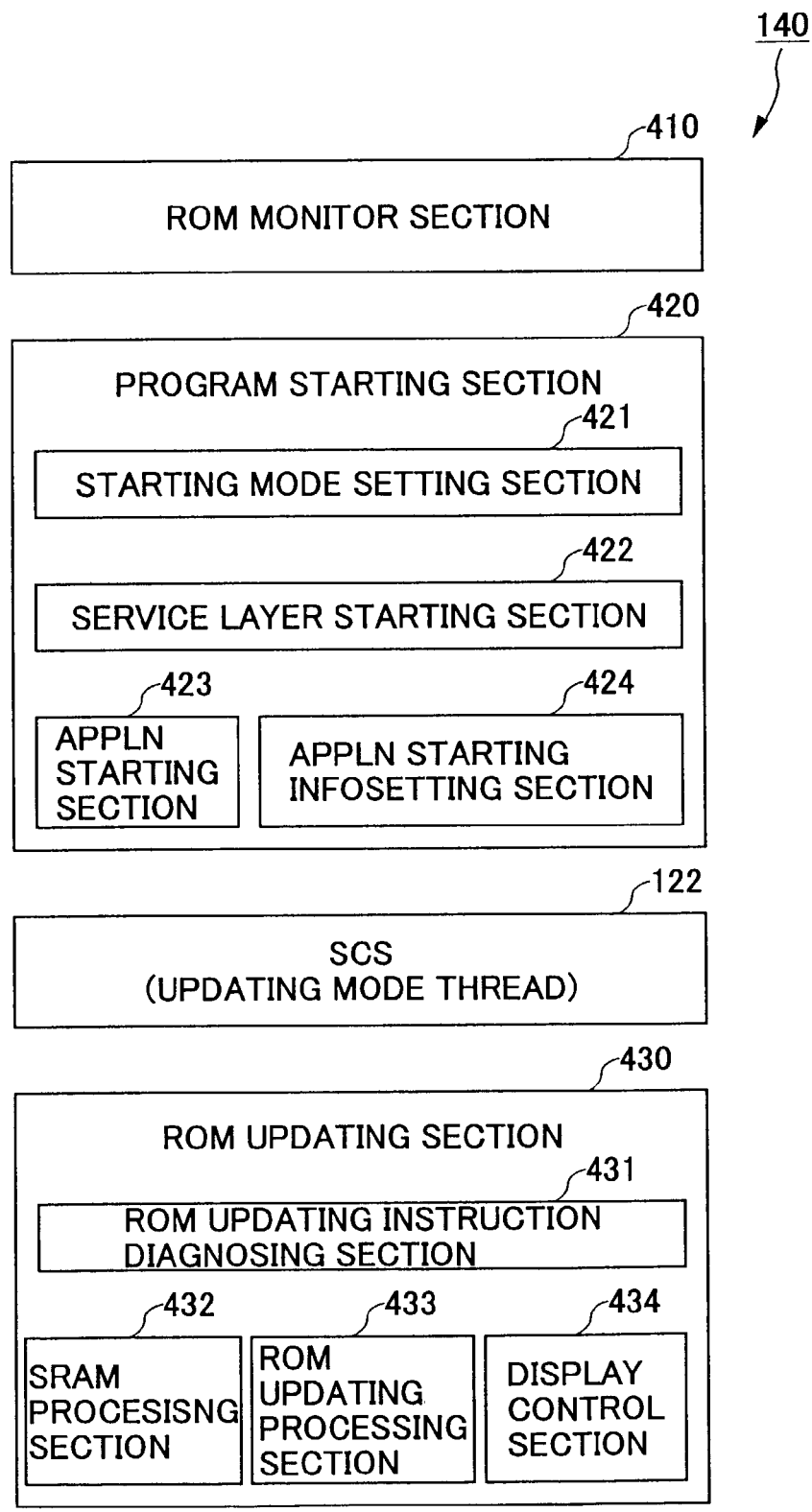
FIG. 5 is a system block diagram showing a structure of a composite apparatus starting section of the first embodiment of the image forming apparatus.

FIG. 5 is a system block diagram showing a structure of the composite apparatus starting section 140 of the first embodiment of the image forming apparatus. In this first embodiment, the composite apparatus starting section 140 of the composite apparatus 100 includes a ROM monitor section 410, a program starting section 420, an SCS 122 which started the ROM updating mode thread, and a ROM updating section 430 as shown in FIG. 5. The ROM monitoring section 410, the program starting section 420 and the ROM updating section 430 are stored in the flash ROM 204.

The program starting section 420 forms a starting information acquiring means (or section), the SCS 122 forms an updating data selection means (or section), and the ROM updating section 430 forms an updating means (or section) of this embodiment. The updating data selection means is not limited to the SCS 122, and the updating data selection means may be formed by a portion or all of the functions of the other control services and/or applications.

The ROM monitoring section 410 is started by executing the ROM monitoring start instruction recorded in a boot vector of the flash ROM 204. The ROM monitoring section 410 carries out processes such as initializing the hardware, diagnosing the controller board 200, initializing the software and starting the general purpose OS 121.

The program starting section 420 is called by the general purpose OS 121. The program starting section 420 includes a starting mode setting section 421, a service layer starting section 422, an application starting section 423, and an application starting information setting section 424.

The starting mode setting section 421 checks the card identification number of the flash card 207, and sets the starting mode to the normal mode or the ROM updating mode. The service layer starting section 422 acquires the starting information of the general purpose OS 121, and starts the control service. The application starting information setting section 424 is executed in the case of the ROM updating mode. The application starting information setting section 424 acquires the starting information of each application, and sets the acquired application starting information to environment variables. The application starting section 423 is executed in the case where the starting mode is the normal mode. The application starting section 423 acquires the starting information of each application, and starts each application.

The ROM updating mode thread of the SCS 122 is started together with other control services by the service layer starting section 422 of the program starting section 420. In the ROM updating mode thread of the SCS 122, the control services and applications operating in the composite apparatus 100 are judged, and the updating data is selected from the flash card 207 depending on the configuration of the composite apparatus 100. In addition, the ROM updating mode thread of the SCS 122 starts the ROM updating section 430, and issues with respect to the ROM updating section 430 a ROM updating instruction together with the information of the selected updating data.

The ROM updating section 430 is started by the ROM updating mode thread of the SCS 122, receives the ROM updating instruction from the SCS 122, and rewrites the flash ROM 204 by the updating data. The ROM updating section 430 includes a ROM updating instruction diagnosing section 431, a ROM updating processing section 433, an SRAM processing section 432, and a display control section 434. The ROM updating instruction diagnosing section 431 diagnoses the ROM updating instruction from the SCS 122. The ROM updating processing section 433 rewrites the program in the flash ROM 204 based on the updating destination address and the diagnosed ROM updating instruction. The SRAM processing section 432 stores various information which are being updated by the ROM updating process into the SRAM 208. The display control section 434 controls display of the progress of the ROM updating process which is being carried out, to the user.

Figure 6:
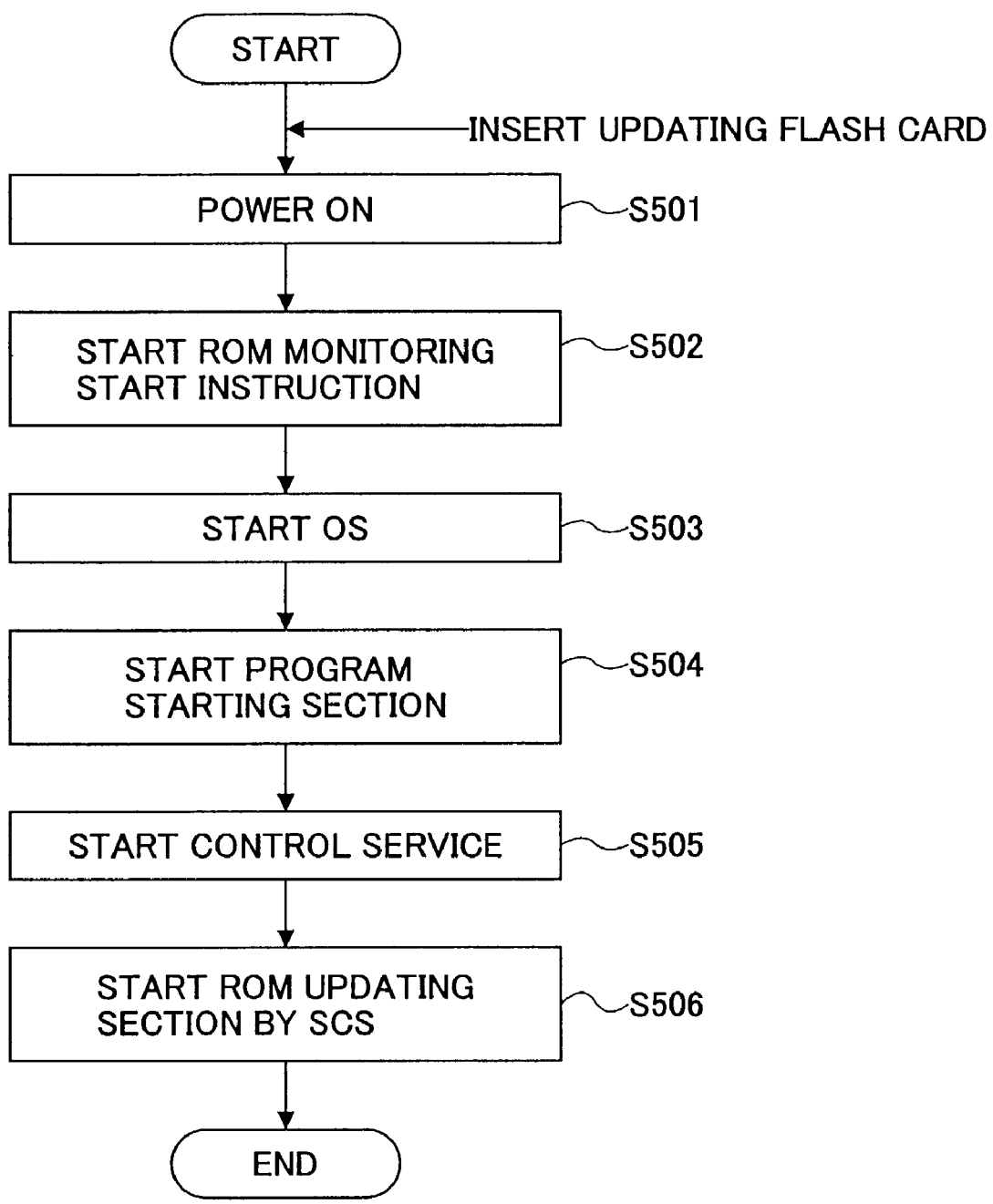
FIG. 6 is a flow chart for explaining a general processing procedure of a ROM updating process in the first embodiment of the image forming apparatus.

Next, a description will be given of the ROM updating process of the composite apparatus 100 having the structure described above. FIG. 6 is a flow chart for explaining a general processing procedure of the ROM updating process in the first embodiment of the image forming apparatus, that is, the composite apparatus 100.

In FIG. 6, a step S501 turns ON the power of the composite apparatus 100 in a state where the flash card 207 is inserted into the flash card interface section 206 of the composite apparatus 100, in order to rewrite (or update) the programs such as the applications and the control services in the flash ROM 204 by the ROM updating process.

After the step S501, a step S502 starts the ROM monitoring section 410 by executing the boot program of the composite apparatus 100 by reading the ROM monitoring start instruction 300 from the beginning of the record of the flash card 207. After the step S502, a step S503 initializes the hardware and the software by the ROM monitoring section 410, and starts the general purpose OS 121.

A step S504 executes the program starting section 420 for starting the programs such as the control services. After the step S504, a step S505 checks the flash card 207 by the program starting section 420 to set the starting mode, and starts the control service.

In a step S506, the ROM updating mode thread of the SCS 122 analyzes the data within the flash card 207 during the control service which is started, and checks the program operating in the composite apparatus 100 so as to determine the updating target program which is to be updated, and starts the ROM updating section 430. The ROM updating section 430 carries out the ROM updating process with respect to the program in the flash ROM 204 determined by the SCS 122 based on the updating data.

Figure 7:
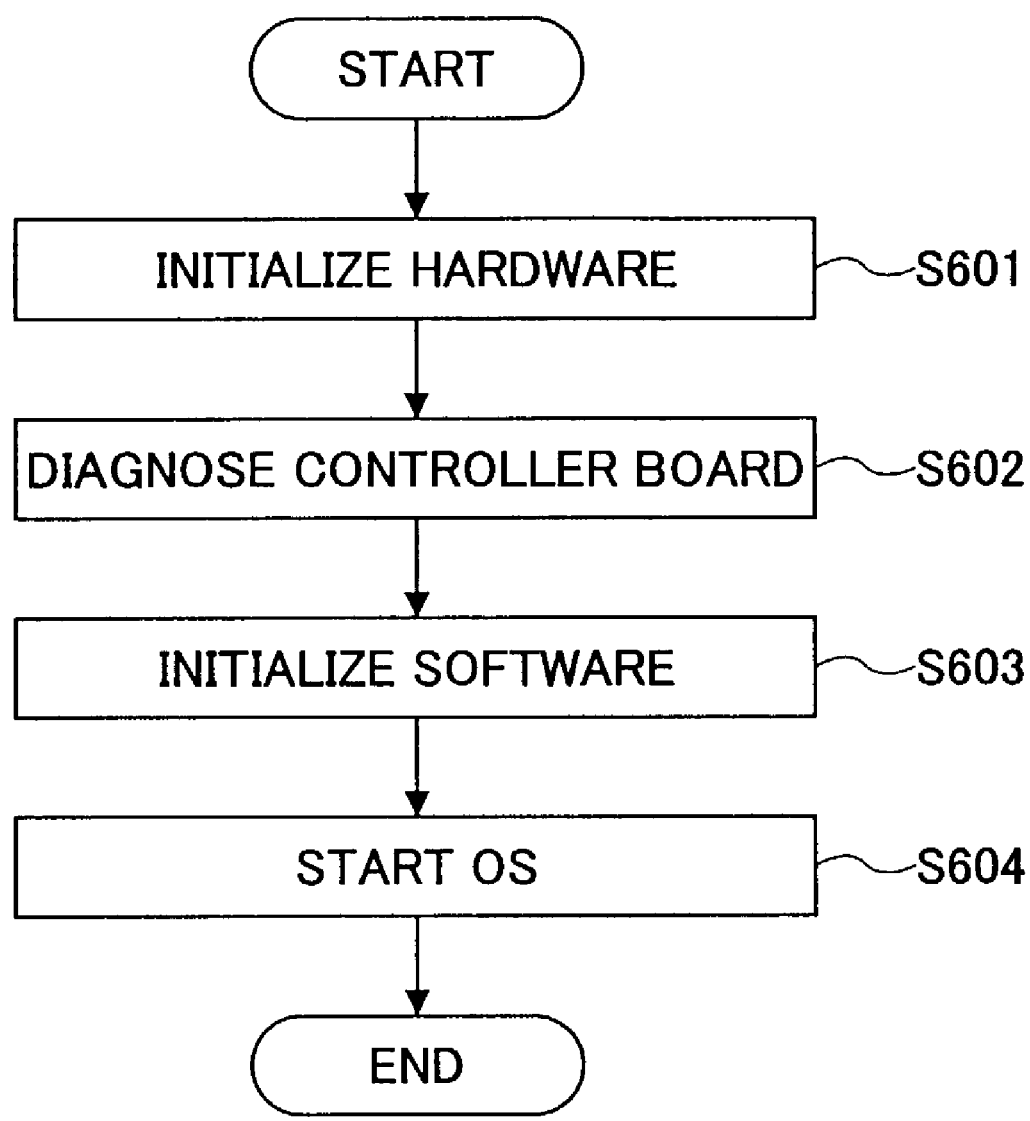
FIG. 7 is a flow chart for explaining a processing procedure carried out by a ROM monitoring section of the first embodiment of the image forming apparatus.

Next, a more detailed description will be given of the processes carried out in the ROM monitoring section 410, the program starting section 420, the SCS 122 and the ROM updating section 430. FIG. 7 is a flow chart for explaining a processing procedure carried out by the ROM monitoring section 410 of the first embodiment of the image forming apparatus, that is, the composite apparatus 100.

In a step S601 shown in FIG. 7, the ROM monitoring section 410 first carries out an initializing process to initialize the hardware. In a step S602 after the step S601, the ROM monitoring section 410 executes a diagnosing process with respect to the controller board 200. Then, in a step S603, the ROM monitoring section 410 carries out an initializing process to initialize the software. The process advances to a step S604 after the step S603, and the step S604 finally starts the general purpose OS 121.

Figure 8:
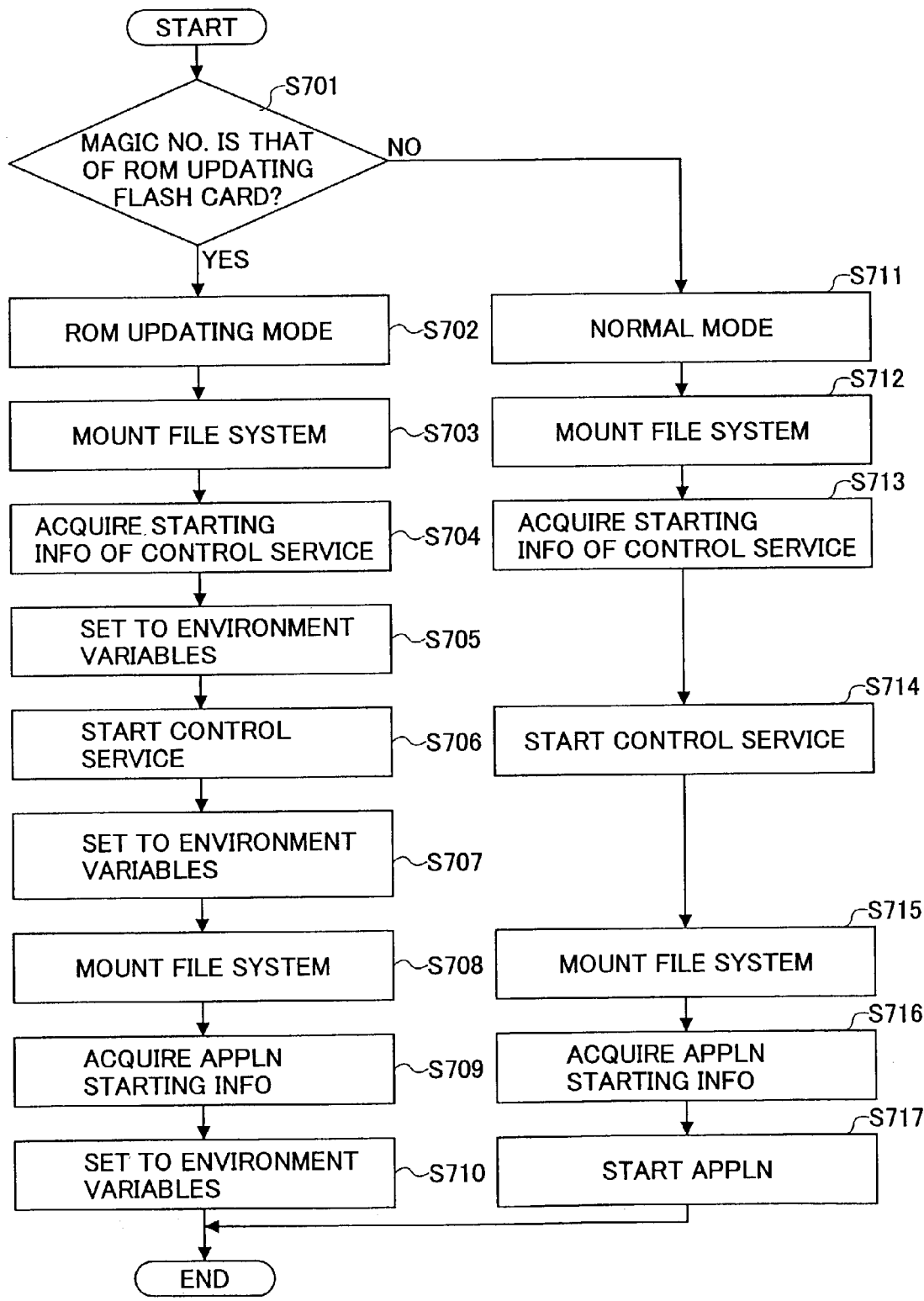
FIG. 8 is a flow chart for explaining a processing procedure of a process carried out by a program starting section of the first embodiment of the image forming apparatus.

FIG. 8 is a flow chart for explaining a processing procedure of the process carried out by the program starting section 420 of the first embodiment of the image forming apparatus, that is, the composite apparatus 100. In a step S701 shown in FIG. 8, the program starting section 420 reads the card identification number 301 of the flash card 207 by the starting mode setting section 421, and checks whether or not a magic number is a predetermined number of allocated for the ROM updating flash card.

If the card identification number 301 is the predetermined number of the ROM updating flash card and the decision result in the step S701 is YES, the process advances to a step S702, and the starting mode setting section 421 carries out the following process by setting the starting mode to the ROM updating mode.

In a step S703 after the step S702, the program starting section 420 mounts a file system of the flash ROM 204 by the service layer starting section 422. In a step S704 after the step S703, the service layer starting section 422 acquires the starting information of the control services such as the SCS 122, the ECS 124 and the MCS 125 from the flash ROM 204. In a step S705, the service layer starting section 422 sets the starting information acquired in the step S704 to the environment variables. In a step S706 after the step S705, the service layer starting section 422 starts the control services such as the SCS 122, the ECS 124 and the MCS 125 on the general purpose OS 121. In this state, each control service starts the ROM updating mode thread thereof.

In a step S707, the service layer starting section 422 sets the control service starting information of the control service which is started to the environment variables if the ROM updating mode thread of the SCS 122 is started.

The control service starting information includes a process ID, a module name and the like of the control service which is started, and is used to identify the program of the control service. The control service starting information is peculiar to each control service.

In a step S708 after the step S707, the program starting section 420 mounts a file system of the flash ROM 204 by the application starting information setting section 424. In a step S709 after the step S708, the application starting information setting section 424 searches for the mounted file system and extracts the program of the application, so as to acquire the application starting information of the application which is started in the composite apparatus 100. In a step S710, the application starting information setting section 424 sets the application starting information acquired in the step S709 to the environment variables.

The application starting information is peculiar to the application and is used to identify the application which can operate in the composite apparatus 100. The application starting information includes a module ID, a module name, version information and the like of the application. In the ROM updating mode, only the control service is started and the application is not started. In addition, the control service starting information and the application starting information set to the environment variables are transferred to the SCS 122. The program is started in the ROM updating mode in this manner.

If the card identification number 301 is a number other than the predetermined number of the ROM updating flash card and the decision result in the step S701 is NO, the process advances to a step S711. In the step S711, the starting mode setting section 421 carries out the following process by setting the starting mode to the normal mode.

In a step S712 after the step S711, the program starting section 420 mounts a file system of the flash ROM 204 by the service layer starting section 422. In a step S713 after the step S712, the service layer starting section 422 acquires the starting information of the control services such as the SCS 122, the ECS 124 and the MCS 125 from the flash ROM 204. In a step S714 after the step S713, the service layer starting section 422 starts the control services such as the SCS 122, the ECS 124 and the MCS 125 on the general purpose OS 121. In this state, each control service starts the normal mode thread thereof.

In a step S715 after the step S714, the program starting section 420 mounts a file system of the flash ROM 204 by the application starting section 423 if the SCS 122 is started. In a step S716 after the step S715, the application starting section 423 acquires the application starting information of the application which operates in the composite apparatus 100 from the mounted file system. In a step S717, the application starting section 423 starts each application.

Figure 9:
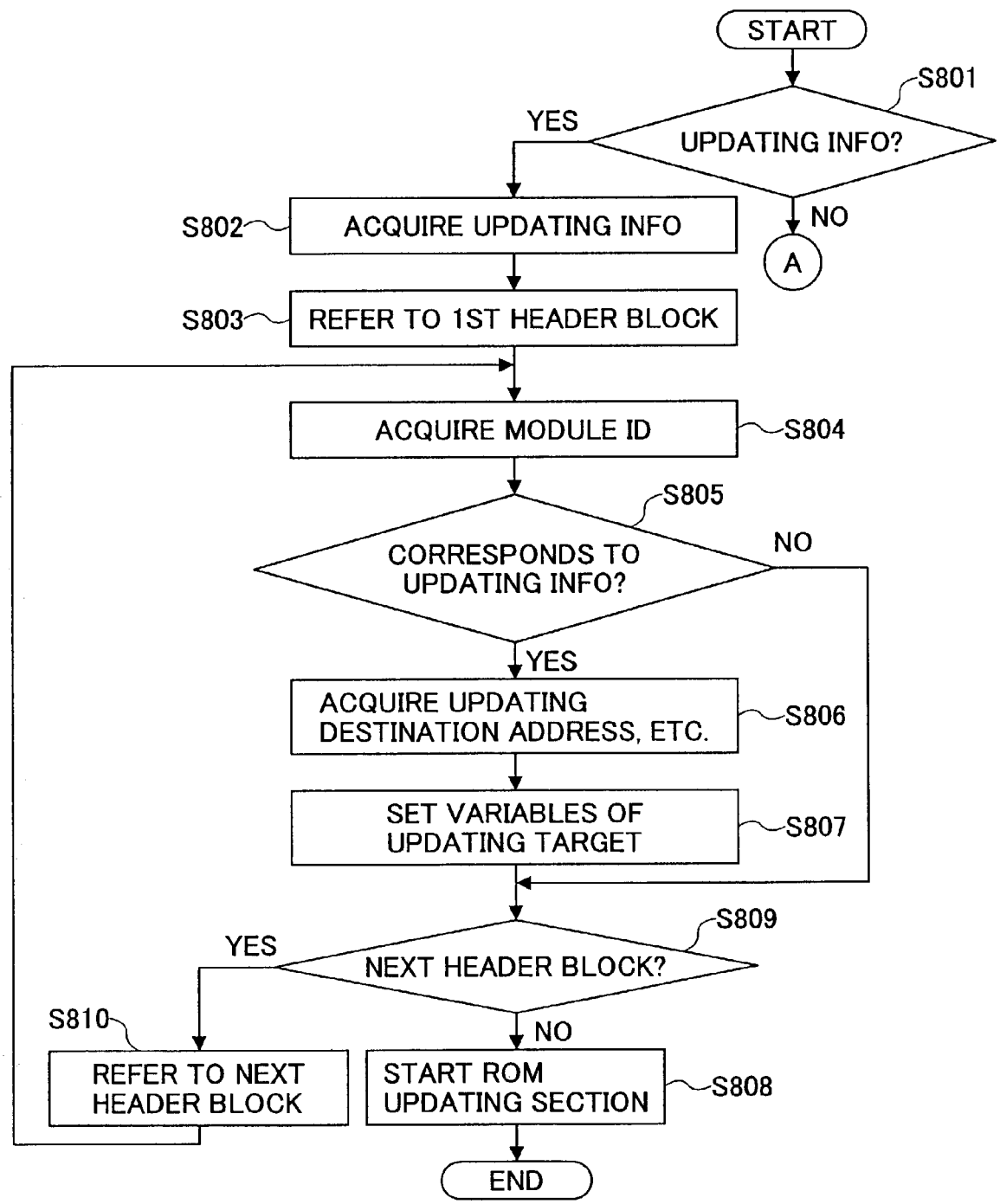
FIG. 9 is a flow chart for explaining a processing procedure of an updating data selection process carried out by a ROM updating mode thread of a SCS in the first embodiment.
Figure 10:
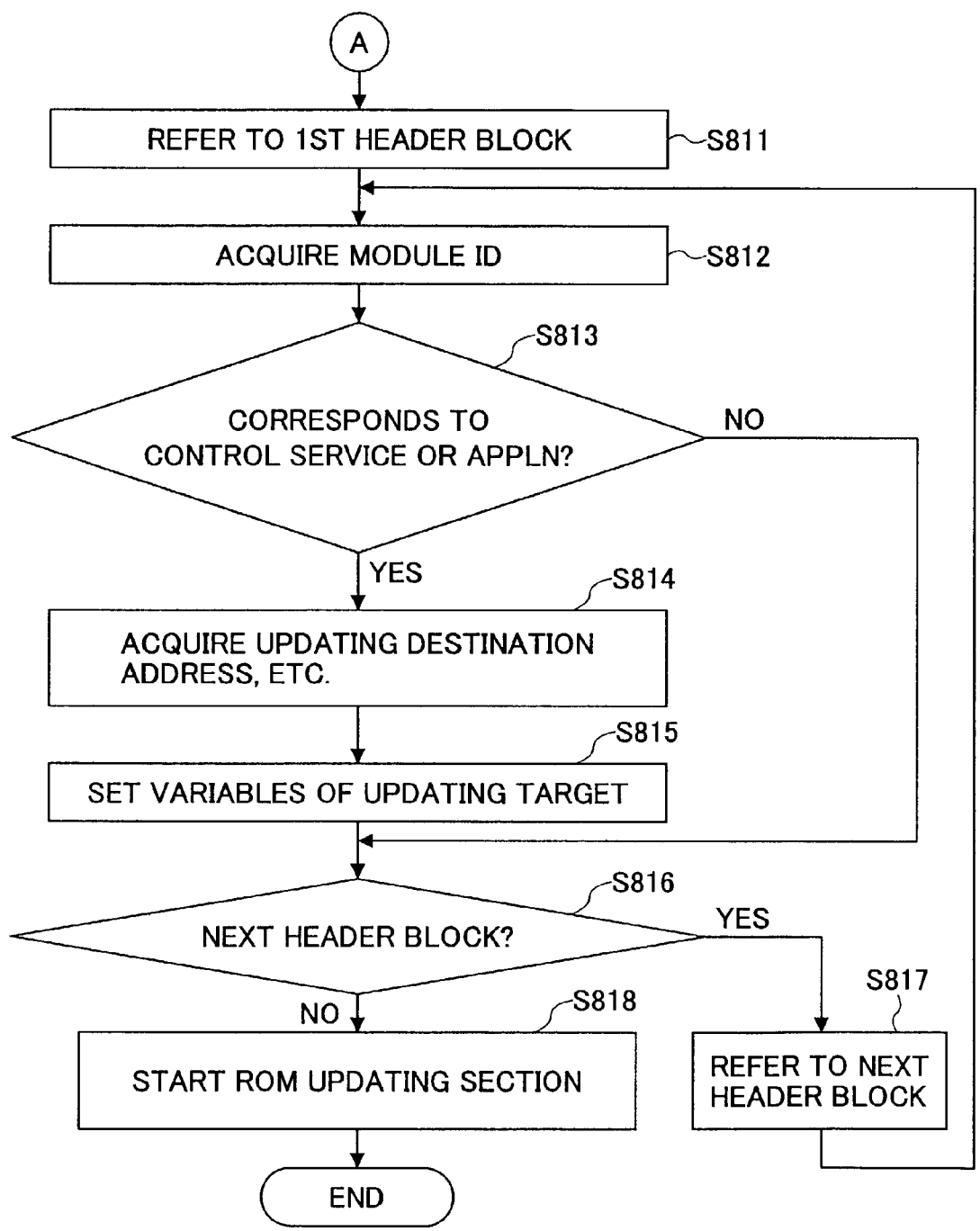
FIG. 10 is a flow chart for explaining the processing procedure of the updating data selection process carried out by the ROM updating mode thread of the SCS in the first embodiment.

FIGS. 9 and 10 are flow charts for explaining a processing procedure of an updating data selection process carried out by the ROM updating mode thread of the SCS 122 in the first embodiment of the image forming apparatus, that is, the composite apparatus 100.

In a step S801 shown in FIG. 8, the ROM updating mode thread of the SCS 122 confirms whether or not the updating information such as the module ID and the updating destination address of the flash ROM 204 is already stored in the SRAM 208.

If the updating information is stored in the SRAM 208 and the decision result in the step S801 is YES, it is judged that the ROM updating mode thread of the SCS 122 is started after the ROM updating process is discontinued, and the process advances to a step S802. In the step S802, the ROM updating mode thread of the SCS 122 acquires the updating information from the SRAM 208.

In a step S803 after the step S802, the ROM updating mode thread of the SCS 122 makes a reference to a first header block in the ROM updating flash card 207. In a step S804 after the step S803, the ROM updating mode thread of the SCS 122 acquires the module ID from the header block.

In a step S805 after the step S804, the ROM updating mode thread of the SCS 122 judges whether or not the module ID acquired from the header block corresponds to the updating information acquired from the SRAM 208.

If the module ID acquired from the header block corresponds to the updating information acquired from the SRAM 208 and the decision result in the step S805 is YES, the process advances to a step S806. In the step S806, the ROM updating mode thread of the SCS 122 selects the updating data of the acquired module ID, and further acquires from the header block the updating destination address, the updating data offset and the updating data size.

In a step S807 after the step S806, the ROM updating mode thread of the SCS 122 sets a set of updating information made up of the module ID, the updating destination address, the updating data offset and the updating data size to variables of the "updating target", and the process advances to a step S809.

On the other hand, if the module ID acquired from the header block does not correspond to the updating information acquired from the SRAM 208 and the decision result in the step S805 is NO, the ROM updating mode thread of the SCS 122 does not select the updating data of the acquired module ID, and the process advances to the step S809. In other words, the ROM updating mode thread of the SCS 122 does not carry out the processes of the steps S806 and S807.

In the step S809, the ROM updating mode thread of the SCS 122 makes a reference to the next header block offset, and judges whether or not the next header block exists. If the next header block exists and the decision result in the step S809 is YES, the process advances to a step S810. In the step S810, the ROM updating mode thread of the SCS 122 makes a reference to the next header block. Thereafter, the ROM updating mode thread of the SCS 122 repeats the process of the steps S804 through S807 and the steps S809 and S810.

On the other hand, if the next header block does not exist and the decision result in the step S809 is NO, the process advances to a step S808. In other words, when the selection of the updating data for the module ID ends with respect to all of the header blocks, the ROM updating mode thread of the SCS 122 starts the ROM updating section 430 to issue a ROM updating instruction, and transfers the variables of the updating target.

If the updating information does not exist in the SRAM 208 and the decision result in the step S801 is NO, the process of the ROM updating section 430 advances to a step S811 shown in FIG. 10. In the step S811, the ROM updating mode thread of the SCS 122 makes a reference to the first header block of the ROM updating flash card 207. In a step S812 after the step S811, the ROM updating mode thread of the SCS 122 acquires the module ID from the header block.

In a step S813 after the step S812, the ROM updating mode thread of the SCS 122 judges whether or not the module ID acquired from the header block corresponds to the control service or application within the environment variables.

If the module ID acquired from the header block corresponds to the control service or application within the environment variables and the decision result in the step S813 is YES, the process advances to a step S814.

In the-step S814, the ROM updating mode thread of the SCS 122 selects the updating data of the acquired module ID, and further acquires from the header block the updating destination address, the updating data offset and the updating data size.

In a step S815 after the step S814, the ROM updating mode thread of the SCS 122 sets a set of updating information made up of the module ID, the updating destination address, the updating data offset and the updating data size to variables of the "updating target", and the process advances to a step S816.

On the other hand, if the module ID acquired from the header block does not correspond to the control service or application within the environment variables and the decision result in the step S813 is NO, the ROM updating mode thread of the SCS 122 does not select the updating data of the acquired module ID, and the process advances to the step S816. In other words, the ROM updating mode thread of the SCS 122 does not carry out the processes of the steps S814 and S815.

In the step S816, the ROM updating mode thread of the SCS 122 makes a reference to the next header block offset, and judges whether or not the next header block exists. If the next header block exists and the decision result in the step S816 is YES, the process advances to a step S817. In the step S817, the ROM updating mode thread of the SCS 122 makes a reference to the next header block. Thereafter, the ROM updating mode thread of the SCS 122 repeats the process of the steps S812 through S817.

On the other hand, if the next header block does not exist and the decision result in the step S816 is NO, the process advances to a step S818. In other words, when the selection of the updating data for the module ID ends with respect to all of the header blocks, the ROM updating mode thread of the SCS 122 starts the ROM updating section 430 to issue a ROM updating instruction, and transfers the variables of the updating target.

Accordingly, the updating data of the module existing within the composite apparatus 100 is selected from the updating data provided by the ROM updating flash card 207.

Figure 11:
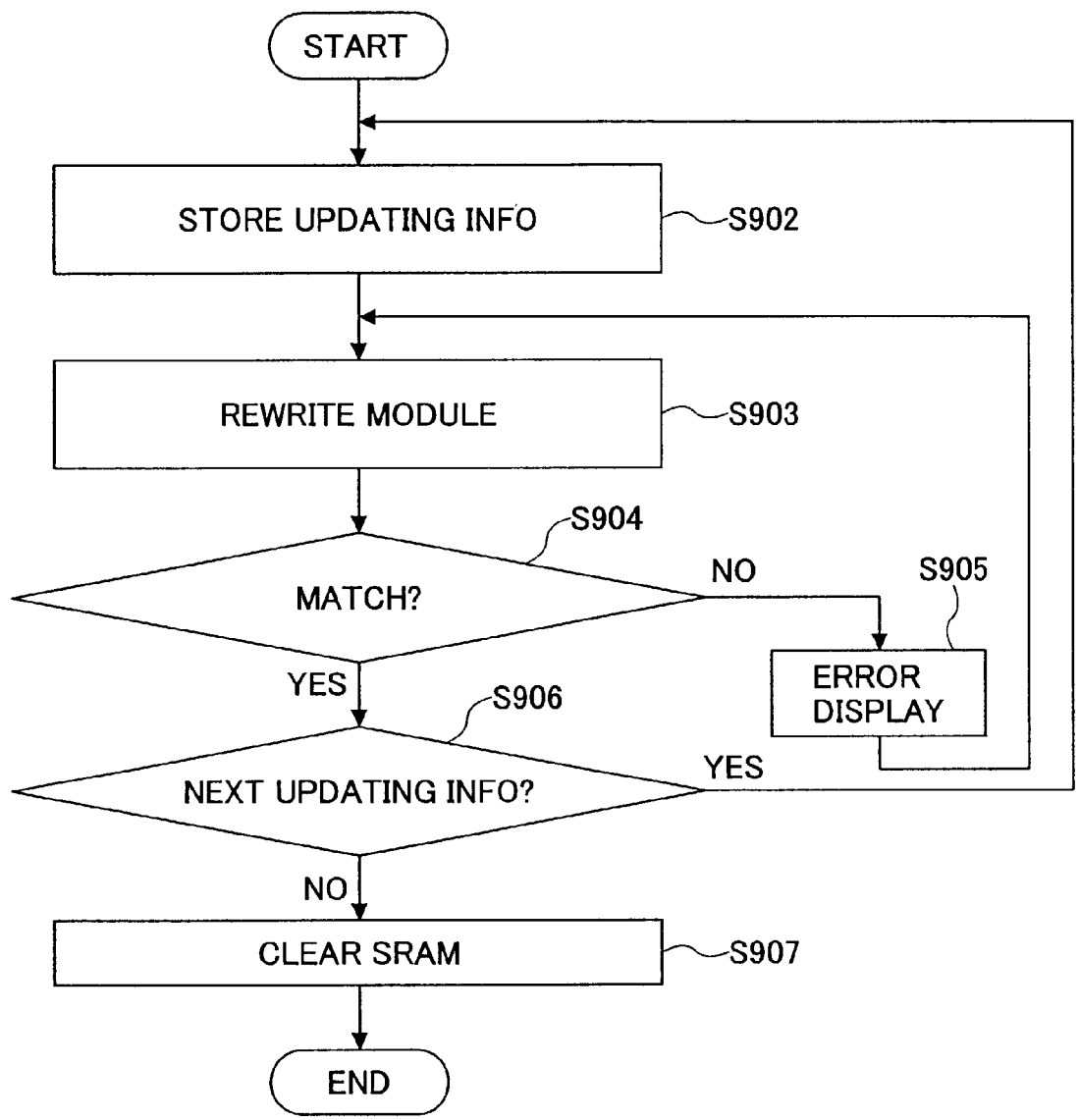
FIG. 11 is a flow chart for explaining a processing procedure of a ROM updating process carried out by a ROM updating section of the first embodiment of the image forming apparatus.

FIG. 11 is a flow chart for explaining a processing procedure of the ROM updating process carried out by the ROM updating section 430 of the first embodiment of the image forming apparatus, that is, the composite apparatus 100.

In a step S902 shown in FIG. 11, the ROM updating section 430 stores the first set of updating information (module ID, version information, updating destination address, updating data offset and updating data size) in the SRAM 208, based on the variables of the updating target received from the SCS 122, and the process advances to a step S903. By carrying out the process of the step S902, it is possible to immediately continue the updating process when started the next time, even when the updating process is discontinued due to generation of an error.

In the step S903, the ROM updating section 430 reads as the updating data the data amounting to the updating data size from the address indicated by the updating data offset from the starting address of the flash card 207. In addition, the step S903 rewrites the module starting from the updating destination address in the flash ROM 204 based on the updating data.

In a step S904 after the step S903, the ROM updating section 430 compares the updating data in the flash card 207 and the data of the module in the flash ROM 204 rewritten in the step S903, and checks whether or not the compared data match. If the compared data do not match and the decision result in the step S904 is NO, the process advances to a step S905. In the step S905, the ROM updating section 430 makes an error display to indicate that the rewriting process (updating process) was unsuccessful, and the process returns to the step S903. In this case, the ROM updating section 430 carries out the rewriting process (updating process) again. On the other hand, if the compared data match and the decision result in the step S904 is YES, the ROM updating section 430 judges that the rewriting process (updating process) was successful, and the process advances to a step S906.

In the step S906, the ROM updating section 430 judges whether or not the next set of updating information exists in the variables of the updating target. If the next set of updating information exists and the decision result in the step S906 is YES, the process returns to the step S902, and the process of the steps S902 through S905 is carried out with respect to the next set of updating information. In other words, the ROM updating section 430 repeats the process of the steps S902 through S906 with respect to all updating information received from the SCS 122.

If the next set of updating information does not exist and the decision result in the step S906 is NO, the process advances to a step S907. In the step S907, the ROM updating section 430 clears the SRAM 208 and ends the ROM updating process. In other words, the ROM updating section 430 clears the SRAM 208 and ends the ROM updating process when the rewriting of all of the modules which are the updating target and received from the SCS 122 ends.

According to this first embodiment, the control service of the composite apparatus 100 is started by the program starting section 420, and the starting information of all of the started control services and the starting information of the applications which can be started is acquired by the SCS 122. In addition, the composite apparatus 100 compares the module identification information recorded in the ROM updating flash card 207 and the acquired starting information, so as to select from the flash card 207 the updating data of the control service or application.

Therefore, the composite apparatus 100 can always select the optimum updating data and execute the ROM updating process depending on the configuration of the control services and the applications which operate in the composite apparatus 100. For this reason, it is possible to prevent erroneous updating of the program of the control service or application which do not need to be updated.

In addition, in the composite apparatus 100, the program starting section 420 judges whether or not the flash card 207 is the ROM updating flash card, based on the card identification number of the flash card 207. In the case where the flash card 207 is the ROM updating flash card, the composite apparatus 100 starts the ROM updating mode thread of the SCS 122 to carry out the ROM updating process. Hence, it is unnecessary to switch a DIP switch in order to start the ROM updating process before starting the composite apparatus 100. As a result, it is possible to prevent a person such as the operator from touching and damaging the controller board 200 when carrying out the ROM updating process.

Second Embodiment

In the ROM updating process of the composite apparatus 100 in the first embodiment described above, the updating data is not prepared for each model of the composite apparatus 100. Consequently, it is necessary to prepare an individual ROM updating flash card 207 for each model of the composite apparatus 100.

On the other hand, in a second embodiment of the image forming apparatus of the present invention, a single ROM updating flash card 207 may be used in common to carry out the ROM updating process of a plurality of models of the composite apparatus 100. The functional structure and the hardware structure of this second embodiment of the image forming apparatus are the same as the functional structure and the hardware structure of the first embodiment of the image forming apparatus, that is, the composite apparatus 100, shown in FIGS. 2 and 3, and illustration and description thereof will be omitted.

Figure 12:
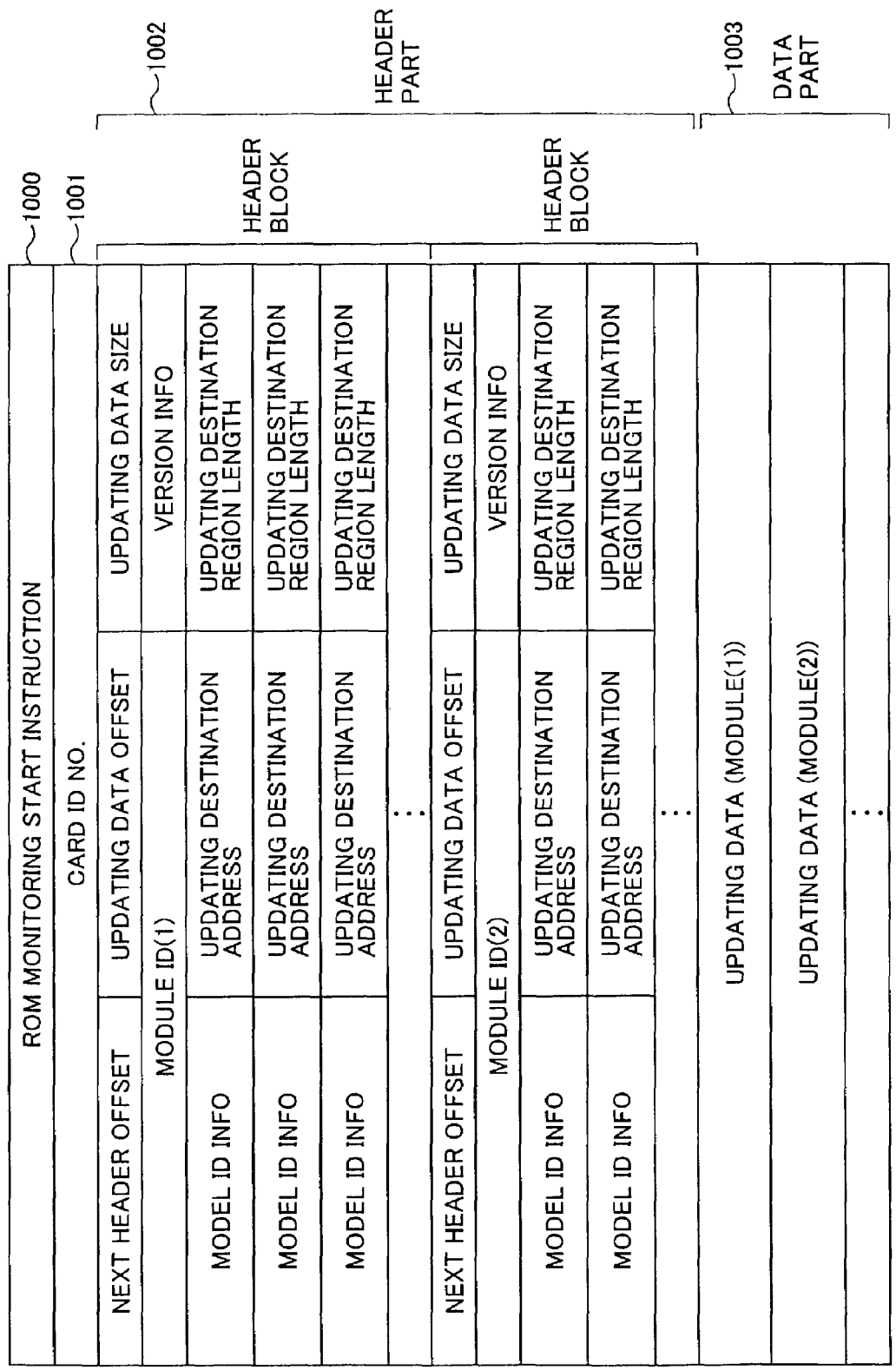
FIG. 12 is a diagram showing a data structure employed by a ROM updating flash card used in a second embodiment of the image forming apparatus according to the present invention.

FIG. 12 is a diagram showing a data structure employed by a ROM updating flash card 207 used in the second embodiment of the image forming apparatus, that is, the composite apparatus 100. Similarly to the flash card 207 shown in FIG. 4 used in the first embodiment, a memory region of the flash card 207 shown in FIG. 12 includes a ROM monitoring start instruction 1000 at the beginning, a card identification number 1001, a header part 1002, and a data part 1003.

The data structure employed by the flash card 207 of this second embodiment differs from that of the first embodiment described above, in that a plurality of model identification information, a plurality of updating destination addresses and a plurality of updating destination region lengths are provided with respect to each updating data in the header part 1002.

In other words, when updating the modules which are common to a plurality of models of the composite apparatus 100 using a common updating data, the model identification information of all models of the composite apparatus 100 which are updating targets, and the updating destination address and the updating destination region length in the flash ROM 204 for each of the models, are registered in the header block.

In this second embodiment, a composite apparatus starting section 140 of the composite apparatus 100 includes a ROM monitoring section 410, a program starting section 420, a ROM updating mode thread of an SCS 122, and a ROM updating section 430, similarly to the first embodiment. The ROM monitoring section 410 forms a model identification information acquiring means (or section), and the program starting section 420 forms a starting information acquiring means (or section) of this embodiment. The SCS 122 forms an updating data selection means (or section), and the ROM updating section 430 forms an updating means (or section) of this embodiment.

The structures of the program starting section 420, and the ROM updating section 430 of the composite apparatus 100 of this second embodiment are the same as those corresponding parts of the first embodiment described above, and illustration and description thereof will be omitted.

The ROM monitoring section 410 carries out processes such as initializing the hardware, diagnosing the controller board 200, initializing the software and starting the general purpose OS 121, similarly to that of the first embodiment. In addition, the ROM monitoring section 410 of this second embodiment acquires the model identification information of the composite apparatus 100 from the flash memory 204, for example.

Next, a description will be given of a ROM updating process of the composite apparatus 100 of this second embodiment. A general processing procedure of the ROM updating process is the same as that in the composite apparatus 100 of the first embodiment described above.

Figure 13:
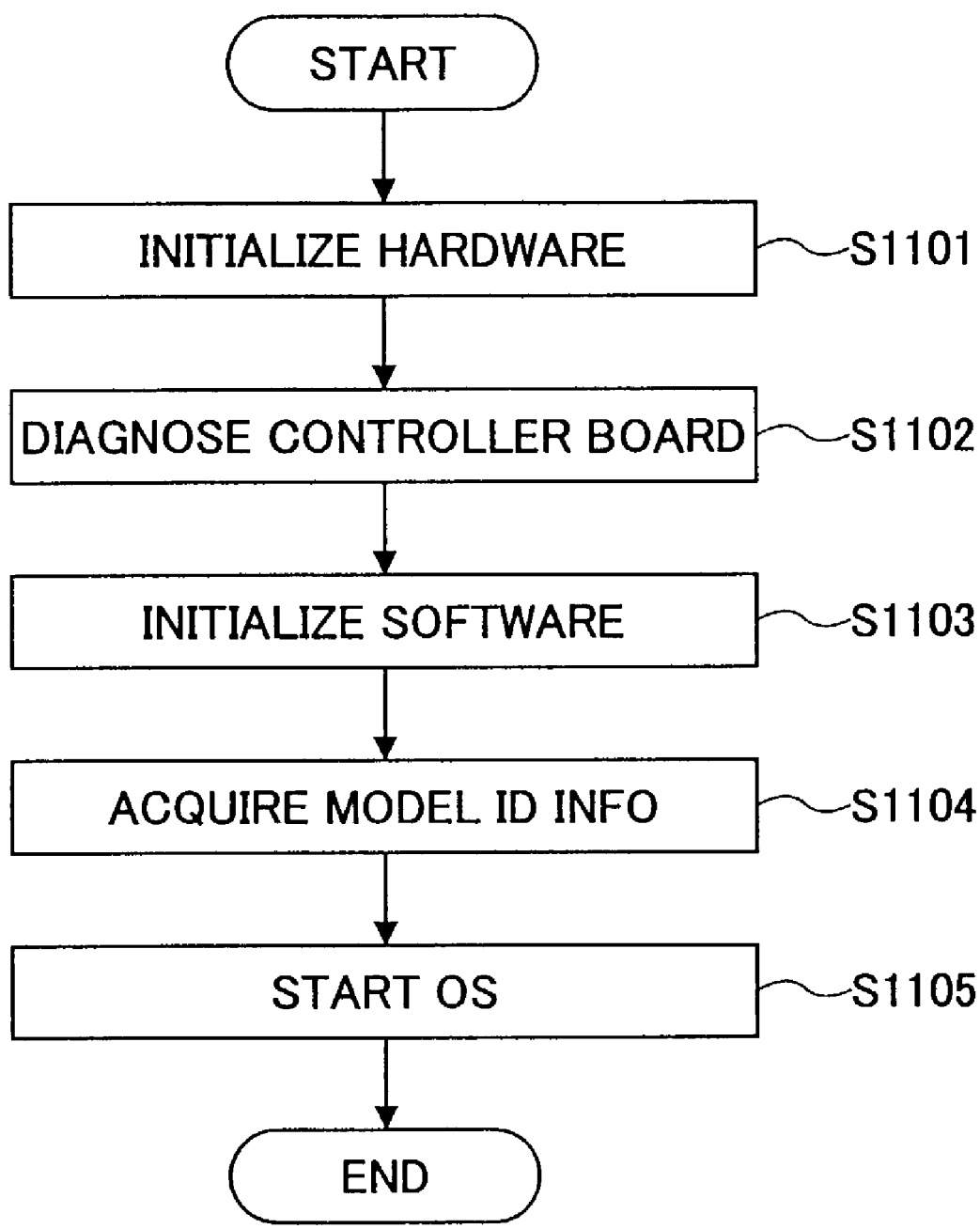
FIG. 13 is a flow chart for explaining a processing procedure carried out by a ROM monitoring section of the second embodiment of the image forming apparatus.

FIG. 13 is a flow chart for explaining a processing procedure carried out by the ROM monitoring section 410 of the second embodiment of the image forming apparatus, that is, the composite apparatus 100. In a step S1101 shown in FIG. 13, the ROM monitoring section 410 first carries out an initializing process to initialize the hardware. In a step S1102 after the step S1101, the ROM monitoring section 410 executes a diagnosing process with respect to the controller board 200. Then, in a step S1103, the ROM monitoring section 410 carries out an initializing process to initialize the software.

In a step S1104 after the step S1103, the ROM monitoring section 410 acquires the model identification information recorded in the flash ROM 204 of the composite apparatus 100. The model identification information is peculiar to each model, and is used to identify the model of the composite apparatus 100. The process advances to a step S1105 after the step S1104, and the step S1105 finally starts the general purpose OS 121.

Thereafter, the program starting section 420 of the composite apparatus 100 of this second embodiment starts the control service, and the following process is carried out by the ROM updating mode thread of the SCS 122 which is started, similarly to the first embodiment.

Figure 14:
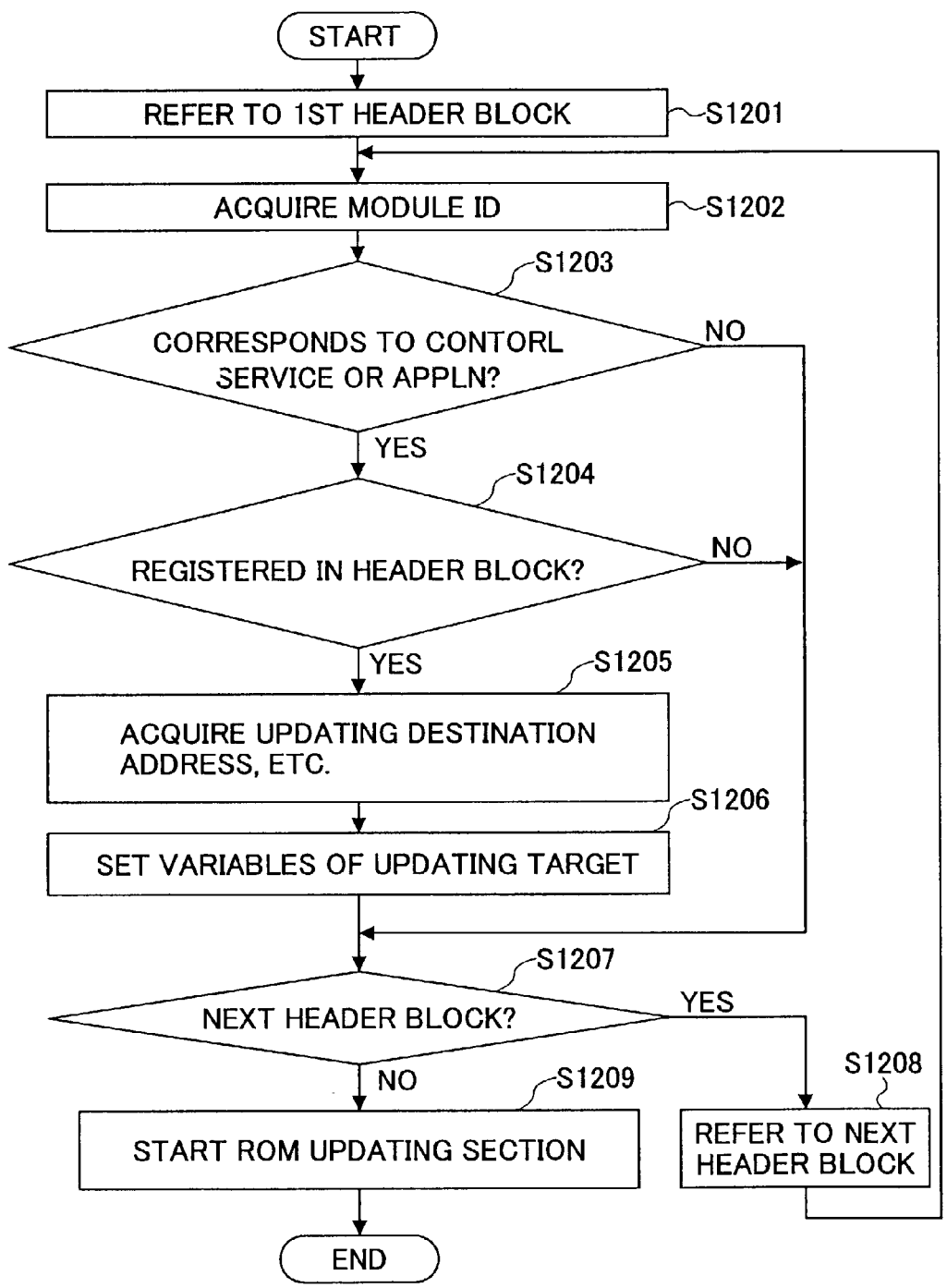
FIG. 14 is a flow chart for explaining a processing procedure of an updating data selection process carried out by a ROM updating mode thread of a SCS in the second embodiment.

FIG. 14 is a flow chart for explaining a processing procedure of an updating data selection process carried out by the ROM updating mode thread of the SCS 122 in the second embodiment. In a step S1201 shown in FIG. 14, the ROM updating mode thread of the SCS 122 makes a reference to a first header block of the ROM updating flash card 207, similarly to the first embodiment. In a step S1202 after the step S1201, the ROM updating mode thread of the SCS 122 acquires the module ID from the header block.

In a step S1203 after the step S1202, the ROM updating mode thread of the SCS 122 judges whether or not the module ID acquired from the header block corresponds to the module of the control service included in the control service starting information or, the application included in the application starting information, of the environment variables received from the program starting section 420.

If the module ID acquired from the header block corresponds to the control service or application which operates in the composite apparatus 100 and the decision result in the step S1203 is YES, the process advances to a step S1204. In the step S1204, the ROM updating mode thread of the SCS 122 checks whether or not the model identification information of the composite apparatus 100 acquired by the ROM monitoring section 410 exists in the model identification information registered within the header block where the present module ID is located.

If the acquired model identification information exists within the header block and the decision result in the step S1204 is YES, the process advances to a step S1205. In the step S1205, the ROM updating mode thread of the SCS 122 selects the updating data of the module ID of the header block, and further acquires the updating destination address, the updating data offset and the updating data size from the header block.

In a step S1206 after the step S1205, the ROM updating mode thread of the SCS 122 sets a set of updating information made up of the module ID, the updating destination address, the updating data offset and the updating data size to variables of the "updating target", and the process advances to a step S1207.

On the other hand, if the module ID acquired from the header block does not correspond to the control service or application which operates in the composite apparatus 100 and the decision result in the step S1203 is NO or, the acquired model identification information does not exist within the header block and the decision result in the step S1204 is NO, the process advances to the step S1207. In other words, if the acquired module ID does not correspond to the control service or application which operates in the composite apparatus 100 or the acquired model identification information does not exist within the header block, the updating data corresponding to the present module ID is not selected, and the process of the steps S1204 through S1206 is not carried out.

In the step S1207, the ROM updating mode thread of the SCS 122 judges whether or not the next header block exists, similarly to the first embodiment. If the next header block exists and the decision result in the step S1207 is YES, the process advances to a step S1208. In the step S1208, the ROM updating mode thread of the SCS 122 makes a reference to the next header block. Thereafter, the ROM updating mode thread of the SCS 122 repeats the process of the steps S1202 through S1207.

On the other hand, if the next header block does not exist and the decision result in the step S1207 is NO, the process advances to a step S1209. In other words, when the selection of the updating data for the module ID ends with respect to all of the header blocks, the ROM updating mode thread of the SCS 122 starts the ROM updating section 430 to issue a ROM updating instruction, and transfers the variables of the updating target.

Accordingly, only the updating data of the module existing within the composite apparatus 100 is selected from the updating data provided by the ROM updating flash card 207 depending on the model of the composite apparatus 100.

After the updating data selection process of the SCS 122, the ROM updating process is carried out by the ROM updating section 430. This ROM updating process is the same as that of the first embodiment, and a description thereof will be omitted.

Therefore, according to the composite apparatus 100 of this second embodiment, the SCS 122 selects the updating data based on the model identification information which is acquired from the ROM updating flash card 207 by the ROM monitoring section 410. Hence, even in a case where the arrangement of the control services and applications which can operate in the composite apparatus 100 differ depending on the model of the composite apparatus 100, it is possible to use one kind of ROM updating flash card 207 in common when carrying out the ROM updating process in a plurality of models of the composite apparatus 100. In other words, the same ROM updating flash card 207 can be shared by the different models of the composite apparatus 100.

For this reason, it is unnecessary to manage different ROM updating flash cards for the different models of the composite apparatus 100, and it is unnecessary to select an appropriate ROM updating flash card for each model of the composite apparatus 100 from a plurality of ROM updating flash cards. As a result, it is possible to simplify the operation of carrying out the ROM updating process.

Third Embodiment

In the ROM updating process of the composite apparatus 100 in the first or second embodiment described above, the configuration of the composite apparatus 100 cannot be judged unless the control service is started in the ROM updating mode.

Accordingly, in a third embodiment of the image forming apparatus according to the present invention, the configuration of the composite apparatus 100 is judged without starting the control service. The functional structure and the hardware structure of this third embodiment of the image forming apparatus are the same as the functional structure and the hardware structure of the first embodiment of the image forming apparatus, that is, the composite apparatus 100, shown in FIGS. 2 and 3, and illustration and description thereof will be omitted.

The data structure employed by the flash card 207 of this third embodiment may be the same as that of the first embodiment shown in FIG. 4 or that of the second embodiment shown in FIG. 12 described above, and a description thereof will be omitted.

Figure 15:
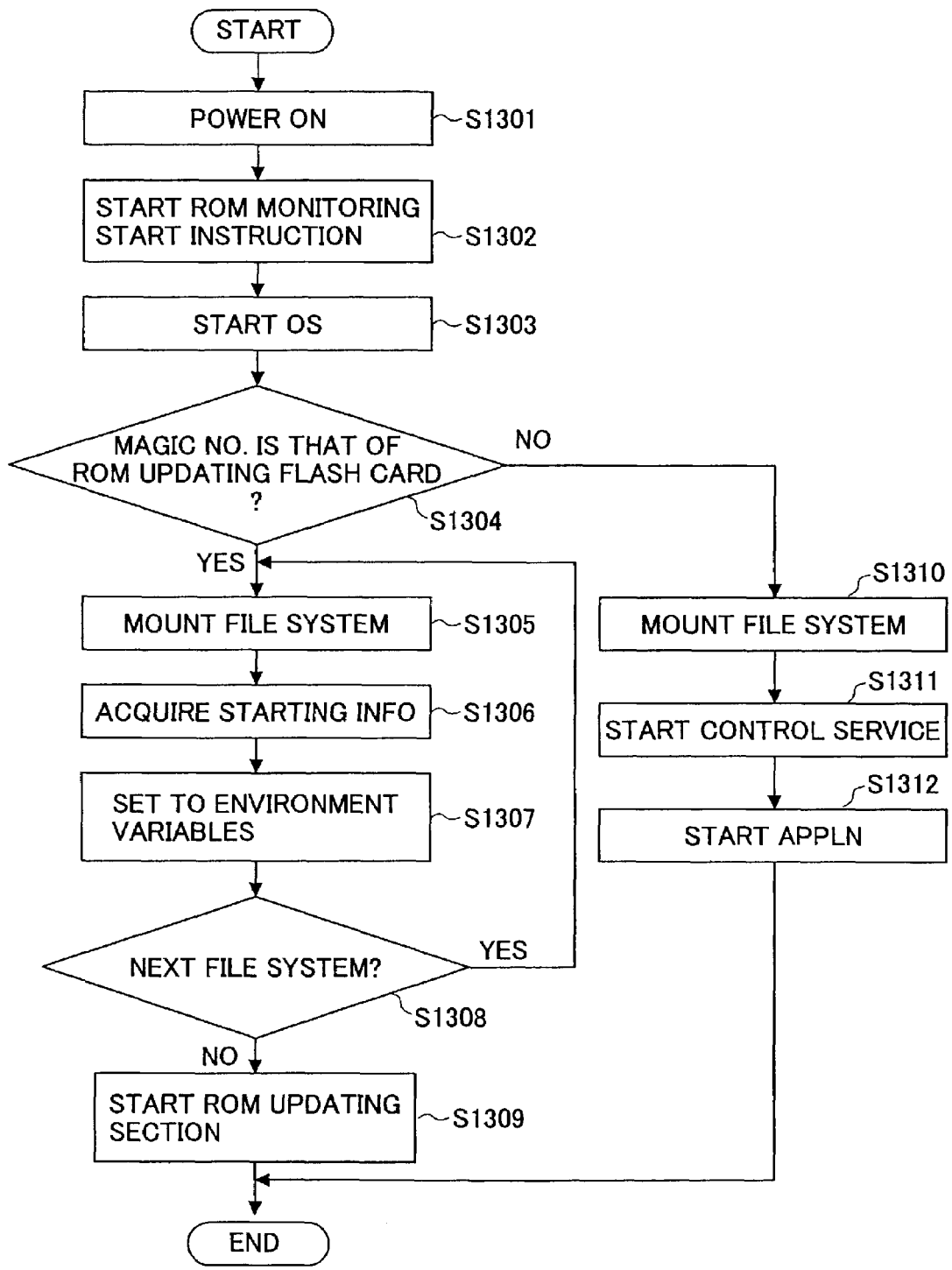
FIG. 15 is a flow chart for explaining a general processing procedure of a ROM updating process in a third embodiment of the image forming apparatus according to the present invention.

Next, a description will be given of a ROM updating process of the composite apparatus 100 of this third embodiment. FIG. 15 is a flow chart for explaining a general processing procedure of the ROM updating process in the third embodiment of the image forming apparatus.

In a step S1301 shown in FIG. 15, the power of the composite apparatus 100 is turned ON in a state where the flash card 207 is inserted into the flash card interface section 206 of the composite apparatus 100. In a step S1302 after the step S1301, a boot program of the composite apparatus 100 reads a ROM monitoring start instruction from the first record of the flash card 207 and executes the ROM monitoring start instruction, so as to start the ROM monitoring section 410. In a step S1303 after the step S1302, the ROM monitoring section 410 initializes the hardware and the software, and starts the general purpose OS 121.

In a step S1304 after the step S1303, the program starting section 420 reads a card identification number 301 of the flash card 207 by the starting mode setting section 421, and checks whether or not a magic number is a predetermined number allocated for the ROM updating flash card.

In a case where the card identification number 301 is the predetermined number allocated for the ROM updating flash card and the decision result in the step S1304 is YES, the process advances to a step S1305 by the starting mode setting section 421. In the step S1305, the program starting section 420 mounts a file system of the flash ROM 204 by the service layer starting section 422 and the application starting section 423. For example, a memory region of the flash ROM 204 has a structure shown in FIG. 16.

Figure 16:
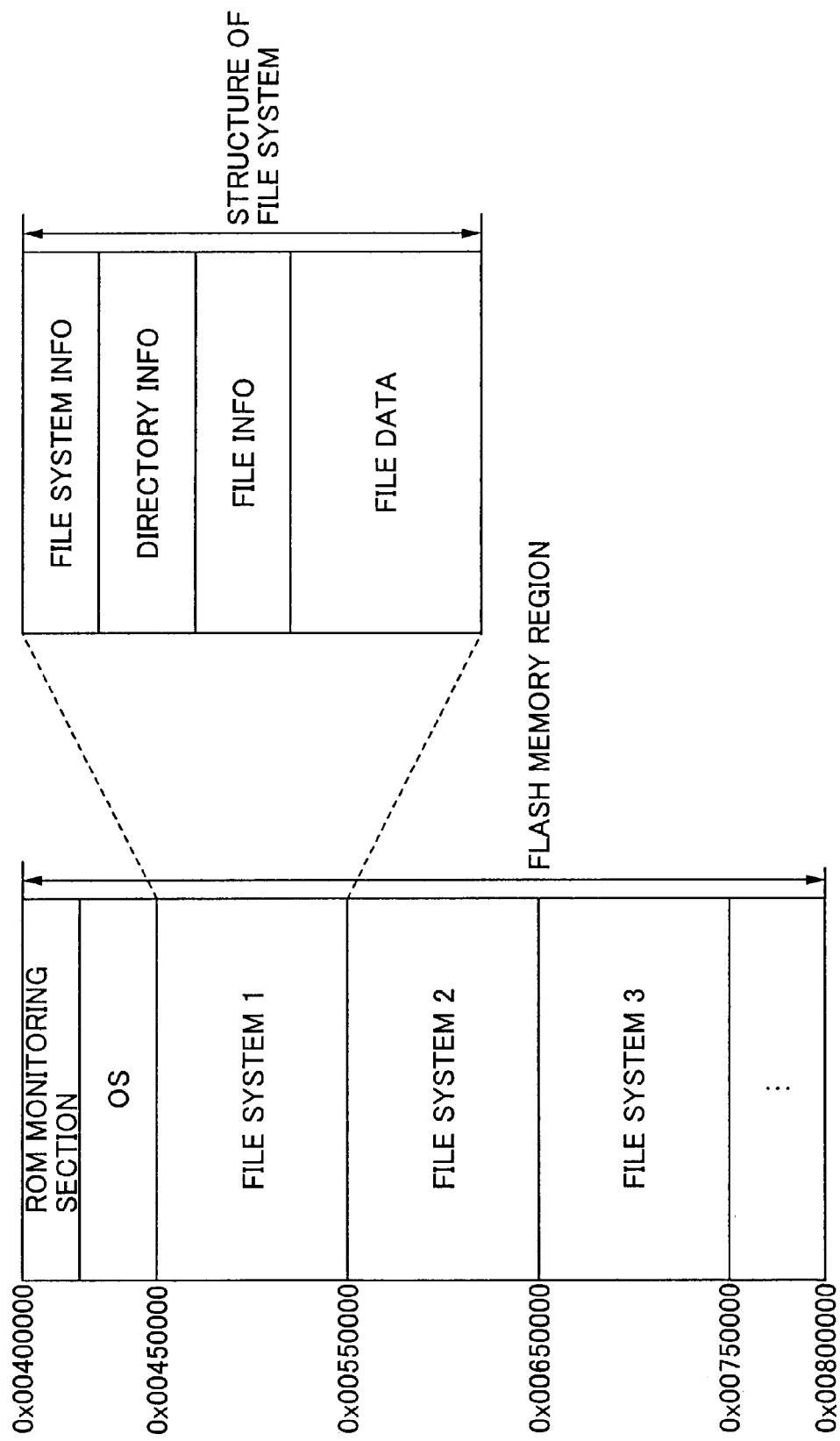
FIG. 16 is a diagram showing a memory region of a flash ROM.

FIG. 16 is a diagram showing the memory region of the flash ROM 204. The memory region of the flash ROM 204 is managed by being divided into a ROM monitoring region, an operating system (OS) region, and one or more file system regions. In addition, the file system region is managed by being divided into a file system information region, a directory information region, a file information region, and a file data region. The one or more file system regions correspond to the service layer or one or more applications of the composite apparatus 100.

In a step S1306 after the step S1305, the service layer starting section 422 and the application starting section 423 acquire the starting information from the flash ROM 204, as will be described later. In a step S1307 after the step S1306, the service layer starting section 422 and the application starting section 423 sets the starting information acquired in the step S1306 to the environment variables.

In a step S1308 after the step S1307, the service layer starting section 422 and the application starting section 423 judges whether or not a next file system exists. If the next file system exists and the decision result in the step S1308 is YES, the process returns to the step S1305 by the service layer starting section 422 and the application starting section 423 so as to make a reference to the next file system. In this case, the service layer starting section 422 and the application starting section 423 repeat the process of the steps S1305 through S1307. On the other hand, if the next file system does not exist and the decision result in the step S1308 is NO, the process advances to a step S1309 by the service layer starting section 422 and the application starting section 423.

In the step S1309, the ROM updating section 430 is started. The ROM updating section 430 carries out a ROM updating process with respect to the program in the flash ROM 204 based on the updating data from the flash card 207.

If the card identification number 301 is other than the predetermined number allocated for the ROM updating flash card and the decision result in the step S1304 is NO, the process advances to a step S1310 by the starting mode setting section 421. In the step S1310, the program starting section 420 mounts a file system of the HDD 205 by the service layer starting section 422 and the application starting section 423.

In a step S1311 after the step S1310, the service layer starting section 422 starts a control service on the general purpose OS 121. In addition, in a step S1312 after the step S1311, the application starting section 423 starts an application on the general purpose OS 121, and the process ends.

Figure 17:
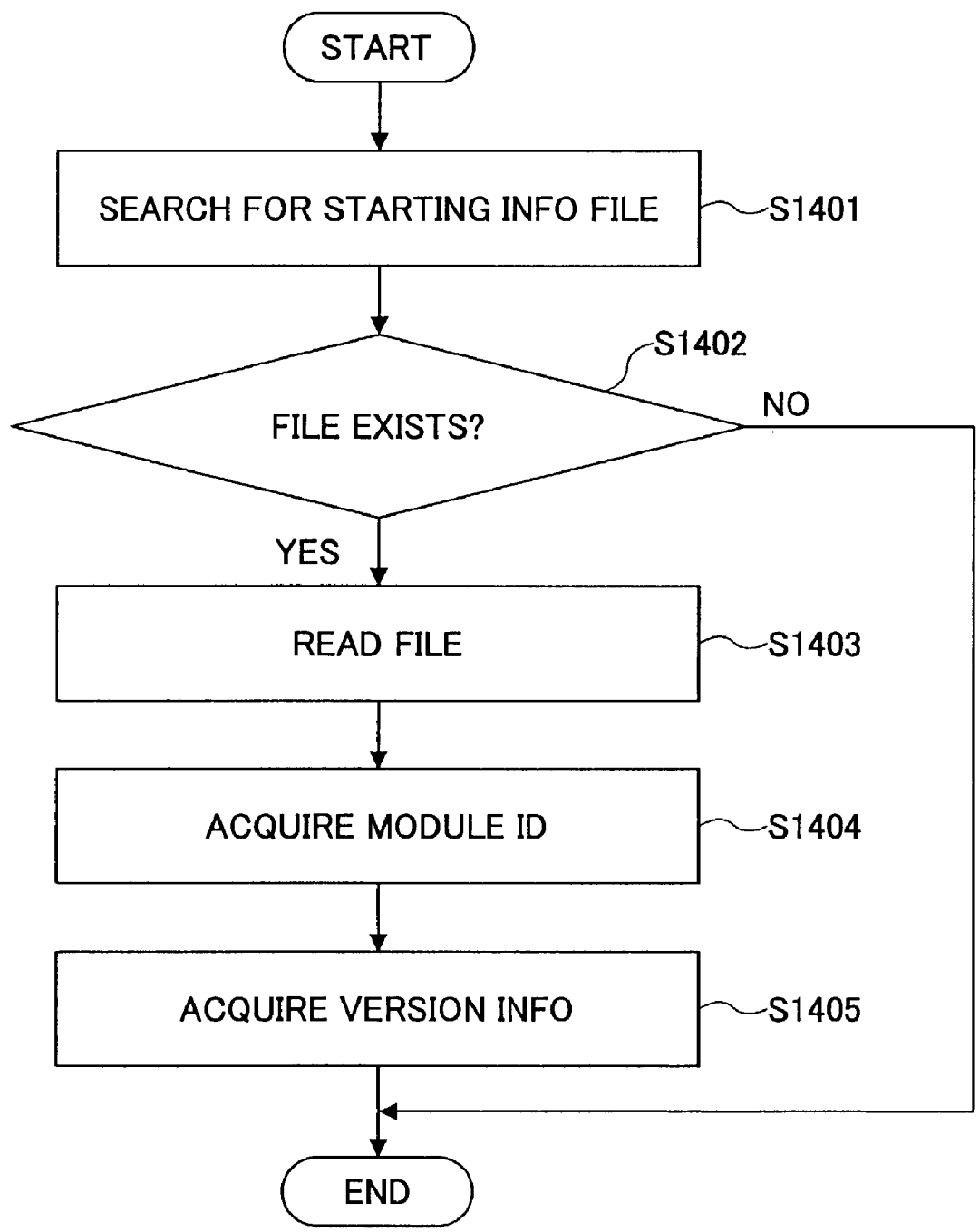
FIG. 17 is a flow chart for explaining a detailed processing procedure of a starting information acquiring process carried out in a third embodiment of the image forming apparatus according to the present invention.

FIG. 17 is a flow chart for explaining a detailed processing procedure of a starting information acquiring process carried out in the third embodiment of the image forming apparatus, that is, the composite apparatus 100.

In a step S1401 shown in FIG. 17, the service layer starting section 422 and the application starting section 423 searches for a starting information file "version.txt" shown in FIG. 18 by a route directory of the file system mounted in the step S1305 shown in FIG. 15.

FIG. 18 is a diagram showing a structure of the starting information file. The starting information file shown in FIG. 18 includes a module ID "SYSTEM", version information "1.00", next file system information "mount/mnt 0×650000" and the like. The next file system information includes information indicating a starting address of a region where the next file system is stored. Accordingly, it is possible to judge whether or not the next file system exists, by referring to the next file system information.

In a step S1402 after the step S1401, the service layer starting section 422 and the application starting section 423 judge whether or not the starting information file "version.txt" exists in the route directory of the mounted file system.

If the starting information file "version.txt" exists and the decision result in the step S1402 is YES, the process advances to a step S1403 by the service layer starting section 422 and the application starting section 423, and the step S1403 reads the starting information file "version.txt".

In a step S1404 after the step S1403, the service layer starting section 422 and the application starting section 423 acquires a module ID from the starting information file "version.txt" which is read in the step S1403. For example, in the case of the starting information file "version.txt" shown in FIG. 18, the service layer starting section 422 and the application starting section 423 acquires the module ID "SYSTEM".

In a step S1405 after the step S1404, the service layer starting section 422 and the application starting section 423 acquires version information from the starting information file "version.txt" read in the step S1403. In the case of the starting information file "version.txt" shown in FIG. 18, the service layer starting section 422 and the application starting section 423 acquire the version information "1.00".

By repeating the starting information acquiring process shown in FIG. 17 for all of the file systems, it is possible to acquire the starting information based on the configuration of the composite apparatus 100.

The updating data selection process and the ROM updating process which are carried out after acquiring the starting information and setting the environment variables are the same as those carried out in the composite apparatus 100 of the first embodiment described above, and a description thereof will be omitted.

Therefore, in the composite apparatus 100 of this third embodiment, it is possible to judge the configuration of the composite apparatus 100 without starting the control service, by acquiring the starting information which is pre-stored in the flash ROM 204 and setting the environment variables.

Hence, the composite apparatus 100 can execute the ROM updating process by always selecting the optimum updating data depending on the configuration of the control services and the applications which operate in the composite apparatus 100. As a result, it is possible to prevent the programs of the control services and the applications which do not need to be updated from being erroneously updated.

The ROM updating flash cards 207 shown in FIGS. 4 and 12 store the data used for the ROM updating process. However, it is of course possible to store in the ROM updating flash card 207 a program which executes the ROM updating process.

Figure 19:
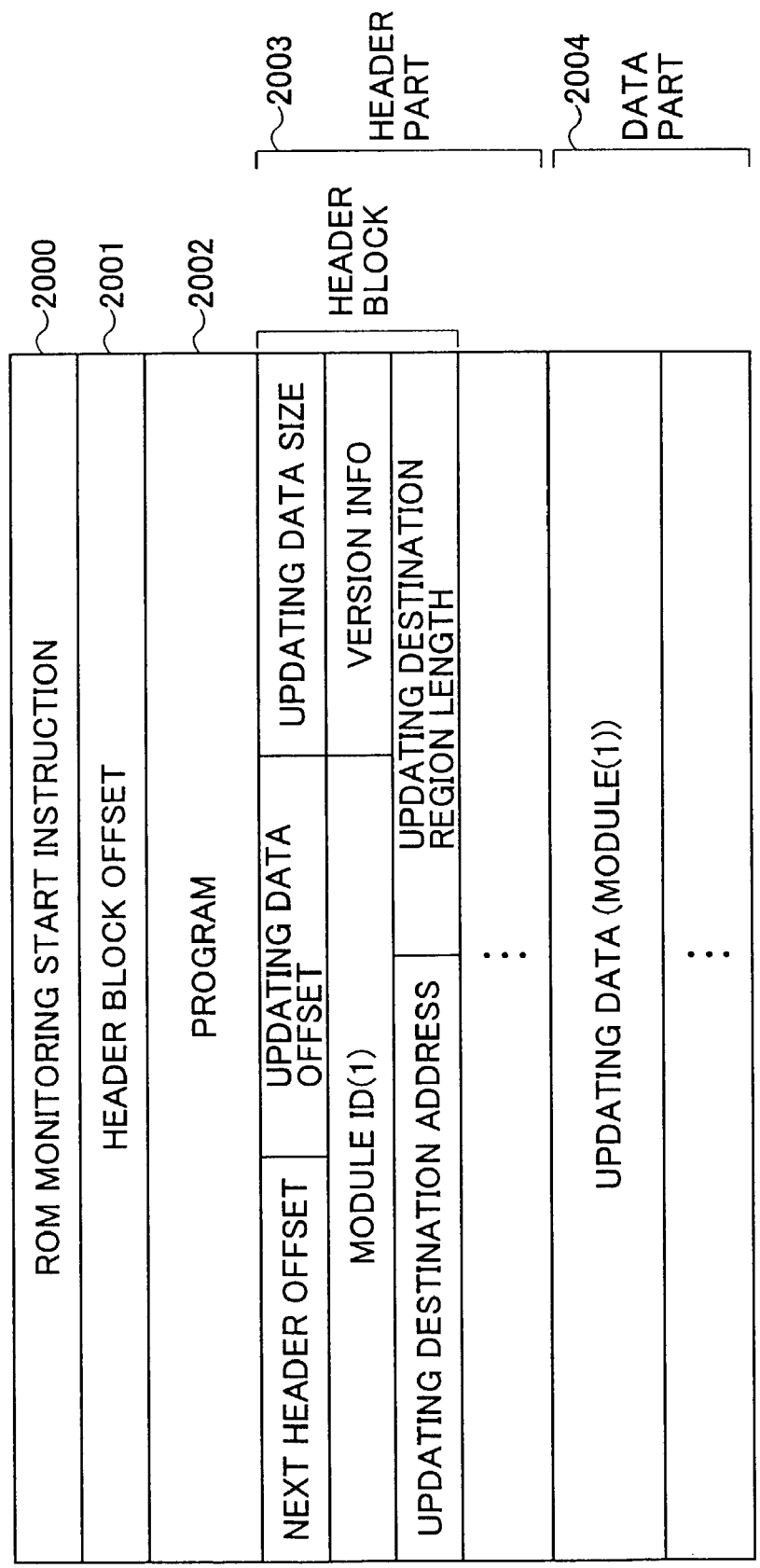
FIG. 19 is a diagram showing a structure of data and programs stored in a ROM updating flash card used by the image forming apparatus.

FIG. 19 is a diagram showing a structure of data and programs stored in the ROM updating flash card 207 used by the composite apparatus 100. The flash card 207 shown in FIG. 19 includes a ROM monitoring start instruction 2000 at the beginning, a header block offset 2001, a program 2002, a header part 2003, and a data part 2004.

The data structure of the flash card 207 shown in FIG. 19 differs from that of the first embodiment, in that the header block offset 2001 and the program 2002 are provided. The header block offset 2001 indicates an offset to the header block. The program 2002 executes the ROM updating process.

In this case, the composite apparatus 100 can acquire the program and the data necessary for the ROM updating process from the flash card 207 shown in FIG. 19, and automatically carry out the ROM updating process.

Further, the present invention is not limited to these embodiments, but various variations and modifications may be made without departing from the scope of the present invention.

What is claimed is:

1. An image forming apparatus comprising:
hardware resources used by an image forming process;
a storage section which stores one or more programs for carrying out processes of user services and control services related to the image forming process;
a start information acquiring section which acquires starting information of each of the programs stored in the storage section;
a module identification information acquiring section which acquires module identification information of at least one arbitrary program from a recording medium which is recorded with updating data for a plurality of programs;
an updating data selection section which selects the updating data corresponding to the at least one arbitrary program from the recording medium, based on the starting information and the module identification information; and
an updating section which updates the at least one arbitrary program stored in the storage section based on the selected updating data.

2. The image forming apparatus as claimed in claim 1, wherein said starting information acquiring section acquires the starting information of each of the programs stored in the storage section upon detection of the recording medium.

3. The image forming apparatus as claimed in claim 1, wherein:
said control services include a system control service carrying out processes of a normal mode thread which carries out a normal process and a program updating mode thread which carries out a process of selecting the updating data from a group of updating data recorded in the recording medium,
said system control service operates as said updating data selection section, and
said starting information acquiring section starts the program updating mode thread of the system control service when carrying out a program updating process.

4. The image forming apparatus as claimed in claim 3, wherein:
each of the control services carry out processes of a normal mode thread which carries out a normal operation and a program updating mode thread which stops processes related to the image forming process, and
said starting information acquiring section starts each program updating mode thread of the control services when carrying out the program updating process.

5. The image forming apparatus as claimed in claim 3, wherein said module identification information acquiring section judges whether or not the updating data is recorded in the recording medium based on medium identification information which is peculiar to the recording medium, and starts each program updating mode thread of the control services if the updating data is recorded in the recording medium.

6. The image forming apparatus as claimed in claim 3, wherein the program updating mode thread of said system control service searches for a file stored in said storage section to acquire the starting information of the arbitrary program, and selects the updating data of the arbitrary program based on the starting information of the arbitrary program.

7. The image forming apparatus as claimed in claim 3, wherein the program updating mode thread of the system control service compares all module identification recorded in the recording medium and the starting information of the arbitrary program, and selects the updating data corresponding to the module identification information matching the starting information.

8. The image forming apparatus as claimed in claim 3, further comprising:
a model identification information acquiring section which acquires a model identification information peculiar to a model of the image forming apparatus,
said recording medium is recorded with the module identification information of each of the programs and the updating data of each of the programs in correspondence with each other, and is further recorded with model identification information of image forming apparatuses in which the programs can operate for each module identification information, and
said program updating mode thread of said system control service compares all module identification information recorded in the recording medium and the starting information of the arbitrary program, so that the updating data is selected based on the module identification information matching the starting information and the model identification information acquired by said model identification information acquiring section.

9. The image forming apparatus as claimed in claim 3, wherein:
said recording medium is recorded with an updating destination region of the storage section where the updating data is written for each module identification information, and
said updating section updates the arbitrary program from the updating destination region of the storage section based on the selected updating data.

10. The image forming apparatus as claimed in claim 9, wherein said recording medium is recorded with the updating destination region for each model identification information.

11. The image forming apparatus as claimed in claim 3, wherein said updating section checks the arbitrary program after being updated by comparing the updated arbitrary program and the updating data to check a match therebetween.

12. The image forming apparatus as claimed in claim 3, further comprising:
a non-volatile memory which stores updating information related to a program updating process,
said updating section stores the updating information in the non-volatile memory when carrying out the program updating process and judges whether or not the updating information is stored in the non-volatile memory prior to the program updating process, so as to update the arbitrary program based on the updating information stored in the non-volatile memory if the updating information is stored in the non-volatile memory.

13. A program updating method for updating at least one arbitrary one of a plurality of programs stored in a storage section of an apparatus, comprising:
a start information acquiring step which acquires starting information of each of the programs stored in the storage section;
a module identification information acquiring step which acquires module identification information of at least one arbitrary program from a recording medium which is recorded with updating data for the plurality of programs;
an updating data selection step which selects the updating data corresponding to the at least one arbitrary program from the recording medium, based on the starting information and the module identification information; and
an updating step which updates the at least one arbitrary program stored in the storage section based on the selected updating data.

14. The program updating method as claimed in claim 13, wherein said starting information acquiring step acquires the starting information of each of the programs stored in the storage section by searching files stored in the storage section.

15. The program updating method as claimed in claim 13, wherein said updating data section step compares all module identification recorded in the recording medium and the starting information of the arbitrary program, and selects the updating data corresponding to the module identification information matching the starting information.

16. The program updating method as claimed in claim 13, further comprising:
- a model identification information acquiring step which acquires a model identification information peculiar to a model of the apparatus,
- said recording medium is recorded with the module identification information of each of the programs and the updating data of each of the programs in correspondence with each other, and is further recorded with model identification information of apparatuses in which the programs can operate for each module identification information, and
- said updating data section step compares all module identification information recorded in the recording medium and the starting information of the arbitrary program, so that the updating data is selected based on the module identification information matching the starting information and the model identification information acquired by said model identification information acquiring step.

17. The program updating method as claimed in claim 13, wherein:
- each of the plurality of programs includes a program updating mode which executes a process related to a program updating process, and
- said starting information acquiring step judges whether or not updating data is recorded in the recording medium based on a medium identification information peculiar to the recording medium, and starts the arbitrary program in the program updating mode if the updating data is recorded in the recording medium.

18. The program updating method as claimed in claim 17, wherein said updating data selection step is executed by the arbitrary program which is started in the program updating mode by said starting information acquiring step.

19. The program updating method as claimed in claim 13, wherein:
- said recording medium is recorded with an updating destination region of the storage section where the updating data is written for each module identification information, and
- said updating step updates the arbitrary program from the updating destination region of the storage section based on the selected updating data.

20. The program updating method as claimed in claim 16, wherein:
- said recording medium is recorded with the updating destination region of the storage section where the updating data is written for each model identification information, and
- said updating step updates the arbitrary program from the updating destination region of the storage section based on the selected updating data.

21. The program updating method as claimed in claim 13, wherein said updating step checks the arbitrary program after being updated by comparing the updated arbitrary program and the updating data to check a match therebetween.

22. The program updating method as claimed in claim 13, wherein:
- said updating step stores updating information related to a program updating process in a non-volatile memory when carrying out the program updating process, and judges whether or not the updating information is stored in the non-volatile memory prior to the program updating process, so as to update the arbitrary program based on the updating information stored in the non-volatile memory if the updating information is stored in the non-volatile memory.

23. A computer-readable storage medium which stores a program for causing a computer to update a program which is stored in a storage section, said program comprising:
- a start information acquiring procedure which causes the computer to acquire starting information of each of the programs stored in the storage section;
- a module identification information acquiring procedure which causes the computer to acquire module identification information of at least one arbitrary program from a recording medium which is recorded with updating data for the plurality of programs;
- an updating data selection procedure which causes the computer to select the updating data corresponding to the at least one arbitrary program from the recording medium, based on the starting information and the module identification information; and
- an updating procedure which causes the computer to update the at least one arbitrary program stored in the storage section based on the selected updating data.

* * * * *